(12) United States Patent
Alliss

(10) Patent No.: US 7,412,768 B2
(45) Date of Patent: Aug. 19, 2008

(54) INVERTIBLE TRIMMER LINE SPOOL FOR A VEGETATION TRIMMER APPARATUS

(76) Inventor: George E. Alliss, 82 Sandpit Rd., Lumberton, NC (US) 28358

( * ) Notice: Subject to any disclaimer, the term of this patent is extended or adjusted under 35 U.S.C. 154(b) by 10 days.

(21) Appl. No.: 11/126,842

(22) Filed: May 11, 2005

(65) Prior Publication Data

US 2005/0252009 A1    Nov. 17, 2005

Related U.S. Application Data

(60) Provisional application No. 60/569,990, filed on May 11, 2004.

(51) Int. Cl.
 B26B 7/00   (2006.01)
 A01D 34/416 (2006.01)
(52) U.S. Cl. .............. 30/276; 30/347; 56/12.7
(58) Field of Classification Search ............... 30/276, 30/347; 56/12.5, 12.7, 295
 See application file for complete search history.

(56) References Cited

U.S. PATENT DOCUMENTS

| | | | | |
|---|---|---|---|---|
| 4,242,797 | A * | 1/1981 | Palmieri et al. | 30/276 |
| 4,274,201 | A * | 6/1981 | Oberg et al. | 30/276 |
| 4,310,970 | A | 1/1982 | Evenson et al. | |
| 4,490,910 | A | 1/1985 | Mattson et al. | |
| 4,672,798 | A * | 6/1987 | Ota | 56/12.7 |
| 4,702,005 | A * | 10/1987 | Pittinger et al. | 30/276 |
| 4,893,410 | A * | 1/1990 | Hoffmann et al. | 30/276 |
| 5,193,278 | A * | 3/1993 | Osakabe et al. | 30/276 |
| 5,293,692 | A * | 3/1994 | Sugihara et al. | 30/276 |
| 5,526,572 | A | 6/1996 | Sugihara et al. | |
| 6,148,523 | A | 11/2000 | Everts et al. | |
| 6,418,627 | B1 * | 7/2002 | Tsunoda et al. | 30/347 |
| 2002/0189107 | A1 | 12/2002 | Arnetoli | |
| 2003/0033718 | A1 | 2/2003 | Alliss | |
| 2003/0188437 | A1 | 10/2003 | Alliss | |
| 2004/0148784 | A1 * | 8/2004 | Grace | 30/276 |
| 2004/0237315 | A1 | 12/2004 | Alliss | |
| 2005/0044725 | A1 | 3/2005 | Alliss | |
| 2006/0026846 | A1 | 2/2006 | Alliss | |

FOREIGN PATENT DOCUMENTS

| | | |
|---|---|---|
| WO | PCT-US2002-026241 | 2/2003 |
| WO | PCT-US2004-027267 | 3/2005 |
| WO | PCT-US2005-016578 | 11/2005 |
| WO | PCT-US2005-026901 | 2/2006 |

* cited by examiner

OTHER PUBLICATIONS

U.S. Appl. No. 11/127,015, filed May 11, 2005, George E. Alliss.

Primary Examiner—Boyer D. Ashley
Assistant Examiner—Laura M. Lee
(74) Attorney, Agent, or Firm—David Lewis

(57) ABSTRACT

A vegetation trimmer comprising an elongate main handle to which is connected a motor that rotatably drives a trimmer head located at a distal end of the handle. The trimmer head defines a rotational axis and includes a housing and a spool rotatably received in the housing for carrying at least one coil of flexible trimmer line. The trimmer head further includes structure for enabling trimmer line to be wound through housing and onto the spool in a user-selected clockwise or counterclockwise direction without removing the spool from the housing such that trimmer line is dischargeable from the trimmer head in an appropriate clockwise or counterclockwise direction dictated by the direction of rotation of the vegetation trimmer drive shaft.

24 Claims, 20 Drawing Sheets

INVERTIBLE TRIMMER LINE SPOOL FOR A VEGETATION TRIMMER APPARATUS

CROSS-REFERENCE TO RELATED APPLICATIONS

This application claims the benefit of U.S. Provisional Patent Application Ser. No. 60/569,990, entitled VEGETATION CUTTING APPARATUS, filed May 11, 2004.

FIELD OF THE INVENTION

The present invention relates in general to vegetation trimmer apparatus and in particular to a vegetation trimmer having flexible filament trimmer line that is selectively dispensed from a spool contained within a trimmer head.

BACKGROUND OF THE INVENTION

Internal combustion engine and electric motor powered vegetation trimmers are commonly used to cut and trim grass, weeds, brush and other vegetation. The typical motorized trimmer comprises an elongate handle to which is connected an internal combustion or electric motor that rotatably drives a trimmer head located at a distal end of the handle. The trimmer head, in turn, carries radially outwardly projecting cutting means which cuts the vegetation as the trimmer head rotates.

The trimmer head may include one or more flexible or rigid cutting means. If rigid, the cutting means typically assumes the form of blades fabricated from plastic and/or metal and often have corrugations or scalloping about their peripheral cutting edges. The blades are pivotally attached to the trimmer head such they yield when they contact hard objects, thereby prolonging the service lives of the blades. Rigid blades are normally used to cut very dense vegetation but they may cause considerable injury to the trimmer operator or other persons should they accidentally be struck by the blades during operation of the trimmer.

If flexible, the cutting means may be fabricated as a continuous strand flexible monofilament plastic line wrapped about a spool contained within the trimmer head. In such devices, the plastic line is typically selectively dispensed by the operator of the trimmer apparatus. One species of these sorts of devices is semi-automatic in operation and utilizes the centrifugal force generated by rotation of the trimmer head to dispense trimmer line. Commonly known as "bump indexing" or "bump and feed" trimmers, these apparatus dispense trimmer line responsive to an operator tapping the base of the trimmer head against a hard surface. An example of bump indexing trimmer head is shown in U.S. Pat. No. 6,279,235.

A disadvantage common among bump and feed trimmers is that the trimmer line frequently becomes jammed when a user attempts to dispense fresh line from the spool. When this occurs, the user must stop the trimming operation, disassemble the trimmer head, fix the jam and reassemble the trimmer head before resuming trimming. Such repeated disruption can be quite frustrating and time-consuming.

Another species of vegetation trimmer apparatus where trimmer line is selectively dispensed from a spool by an operator is fully manual in operation. Devices of this sort comprise one or more, typically spring-biased, indexing pins or buttons that are connected to one or more internal trimmer line carrying spools. In order to dispense trimmer line, an operator displaces the indexing pin(s) or button(s) from seating engagement with one or more holes provided in the trimmer head housing. Once the indexing pin(s) or button(s) are separated from the housing, the user either turns the internal spool(s) or pulls on the trimmer line itself from the spool in order to pay out the line from the trimmer head. When the desired length(s) of trimmer line have been dispensed, the operator reseats the indexing pin(s) or button(s) into their associated indexing opening(s) in the trimmer head housing.

The trimmer line dispensing steps required of conventional fully manual trimmer heads are often cumbersome to perform with two hands. The trimmers are also complicated in design which needlessly increases their manufacturing costs. Examples of various designs of fully manual trimmer line trimmer heads are disclosed in U.S. Pat. Nos. 4,271,595; 4,172,322; 4,097,991; 3,826,068 and 3,708,967.

In addition to trimmer line dispensing problems, presently available semi-automatic and fully manual trimmer heads are often difficult to reload with fresh trimmer line when their spools have been depleted. Once the new trimmer line has been wrapped around the spool, the installer must grasp the trimmer head housing while holding the line in the wrapped position about the spool and then insert the spool into the housing. This procedure is especially cumbersome with respect to bump indexing trimmers because the installer must also hold and/or maintain alignment of any springs or other loose components of the bump and feed indexing system during the spool installation process.

Attempts to overcome these problems have been proposed in the prior art. For example, U.S. Pat. Nos. 5,345,683; 5,671,536 and 6,263,580 and Published U.S. Patent Application Nos. 2004/0134078 and 2005/0076515 disclose spool reloading solutions for bump and feed trimmers wherein trimmer line can be wound onto the internal spool without removing the spool from the trimmer head housing, although the system taught by U.S. Pat. No. 5,671,536 requires additional user participation to anchor the trimmer line to the spool prior to winding/loading it on the spool. However, the results are trimmer line spools of highly complex configuration whose manufacturing costs are unnecessarily expensive.

U.S. Pat. No. 5,765,287 also describes a trimmer head that enables winding of a desired quantity of trimmer line on a spool without removing the spool from the trimmer housing. In one embodiment, the device incorporates a rigid trimmer line guide tube that spans most of the diameter of the spool. Trimmer line is threaded into one trimmer line exit port in the trimmer head housing and passed through the guide tube. Upon exiting the guide tube the trimmer line is passed through the opposite trimmer head housing exit port. When the desired length of trimmer line is threaded through the trimmer head, the installer rotates a knob integrally connected to the spool and the trimmer line is wound onto the core of the spool.

The trimmer head disclosed in U.S. Pat. No. 5,765,287 suffers certain disadvantages, however. That is, the rigid trimmer line guide tube presents an obstruction in the spool chamber that hinders uniform and compact winding of the trimmer line onto the spool. Additionally, the trimmer line can also be damaged or severed as it comes into contact slotted edges at the opposite ends of the guide tube during winding. And, the trimmer head assembly of U.S. Pat. No. 5,765,287, like those of U.S. Pat. Nos. 5,345,683; 5,671,536 and 6,263,580 and Published U.S. Patent Application Nos. 2004/0134078 and 2005/0076515 permit winding of trimmer line onto the trimmer line spool in only one direction, either clockwise or counterclockwise, thereby limiting their practical application to a subset of the total population of powered vegetation trimmer apparatus.

Lastly, U.S. Pat. No. 4,959,904 discloses a vegetation trimmer head that permits trimmer line to be wound onto the trimmer line spool in either a clockwise or counterclockwise direction for appropriate clockwise or counterclockwise discharge. However, the user must engage in a cumbersome and time-consuming procedure when reloading trimmer line onto the spool. That is, a user must disassemble the trimmer housing, remove the spool, manually wind new line onto the spool, reinsert the spool into the housing and reassemble the housing.

An advantage exists, therefore, for a vegetation trimmer apparatus including a rotatable trimmer head that incorporates trimmer line indexing means and trimmer line winding means of simple, economical and reliable design, construction and operation.

A further advantage exists for a vegetation trimmer apparatus including a rotatable trimmer head that incorporates a trimmer line spool onto which trimmer line may be easily and practically wound in either a clockwise or counterclockwise direction without removing the spool from the trimmer housing.

Other details, objects and advantages of the present invention will become apparent as the following description of the presently preferred embodiments and presently preferred methods of practicing the invention proceeds.

SUMMARY OF THE INVENTION

The present invention provides a motorized vegetation trimmer apparatus comprising an elongate main handle to which is connected an internal combustion or electric motor that rotatably drives a trimmer head located at a distal end of the handle. The trimmer apparatus preferably includes a steering handle attached to the main handle to facilitate guidance of the apparatus during operation.

The trimmer head defines a rotational axis and comprises a housing and a spool contained within the housing. The spool carries one or more radially outwardly projecting cutting means which cut the vegetation as the trimmer head rotates. The cutting means comprises at least one continuous length of pliant strand or string that is wound about the spool. The pliant strand is preferably flexible monofilament plastic of a type used in conventional vegetation trimmer apparatus, e.g., nylon or the like. According to preferred embodiments, fresh cutting means is preferably dispensed by unseating latch means carried by the spool from seat means carried by the trimmer head housing, winding the spool until a desired quantity of cutting means has been dispensed and reseating the latch means with the seat means. The spool may be constructed to wind and dispense trimmer line in both clockwise and counterclockwise directions. The spool may also carry a yieldable trimmer line guide for guiding trimmer line between opposed trimmer line exit ports in the housing. So constructed, the trimmer head is uncomplicated in design, reliable and multifunctional in operation, and inexpensive and simple to manufacture.

BRIEF DESCRIPTION OF THE DRAWINGS

The invention will become more readily apparent from the following description of preferred embodiments thereof shown, by way of example only, in the accompanying drawings wherein.

DETAILED DESCRIPTION OF THE INVENTION

Figure 1:
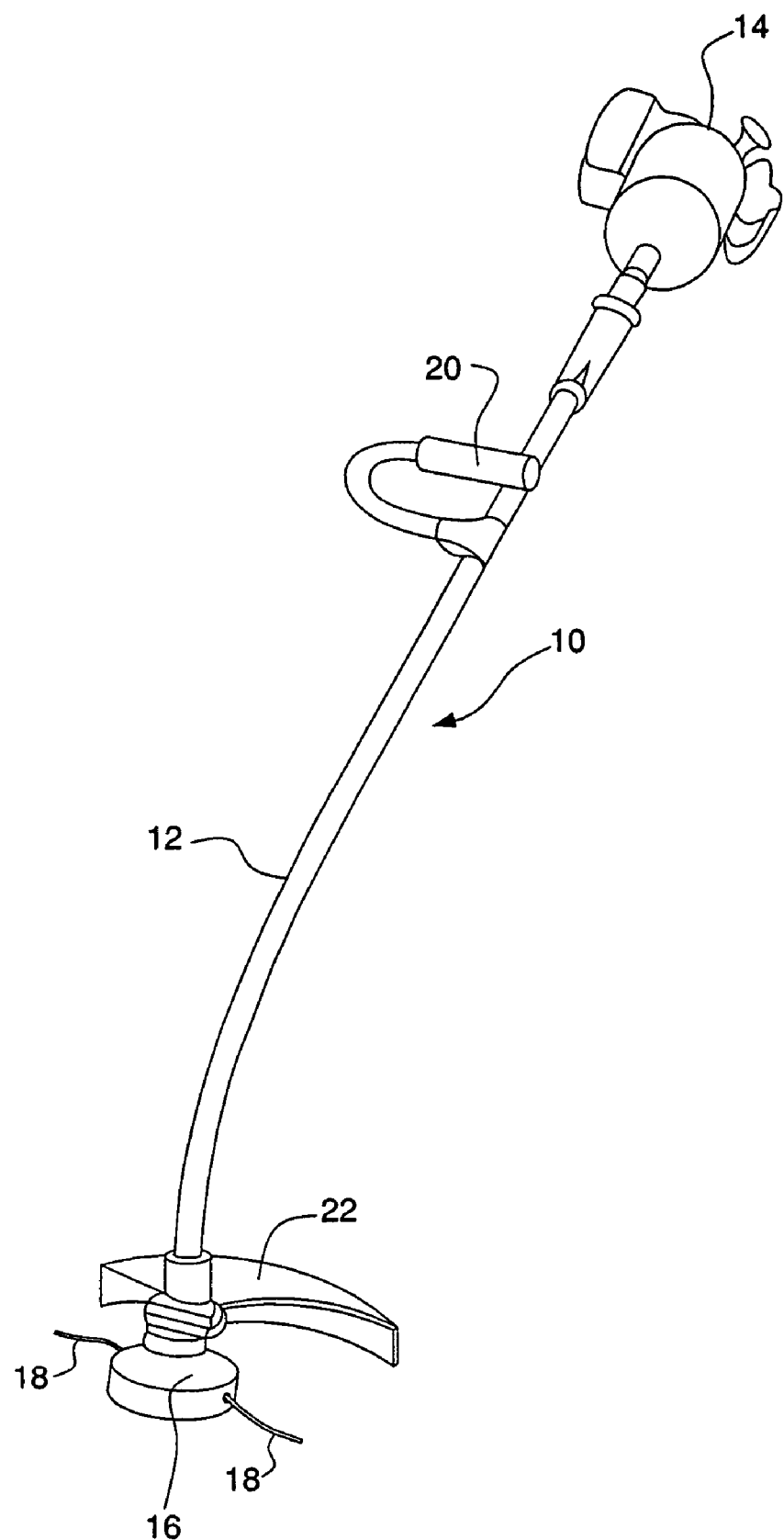
FIG. 1 is a perspective view of a motorized vegetation trimmer apparatus including a rotatable trimmer head and a plurality of flexible cutting means according to the present invention.

Referring to the drawings, wherein like references indicate like or similar elements throughout the several views, there is shown in FIG. 1 a motorized vegetation trimmer apparatus 10 according to the present invention. Apparatus 10 comprises an elongate main handle 12 which to which is connected an internal combustion or electric motor 14 which rotatably drives a trimmer head 16 located at a distal end of the handle. Trimmer head 16 carries one or more radially outwardly projecting cutting means 18 which cut the vegetation as the trimmer head rotates. Preferably, trimmer apparatus 10 includes a steering handle 20 attached to the main handle 12 to facilitate guidance of the apparatus during operation. A shield 22 is also desirably provided for the operator's safety.

Figure 2:
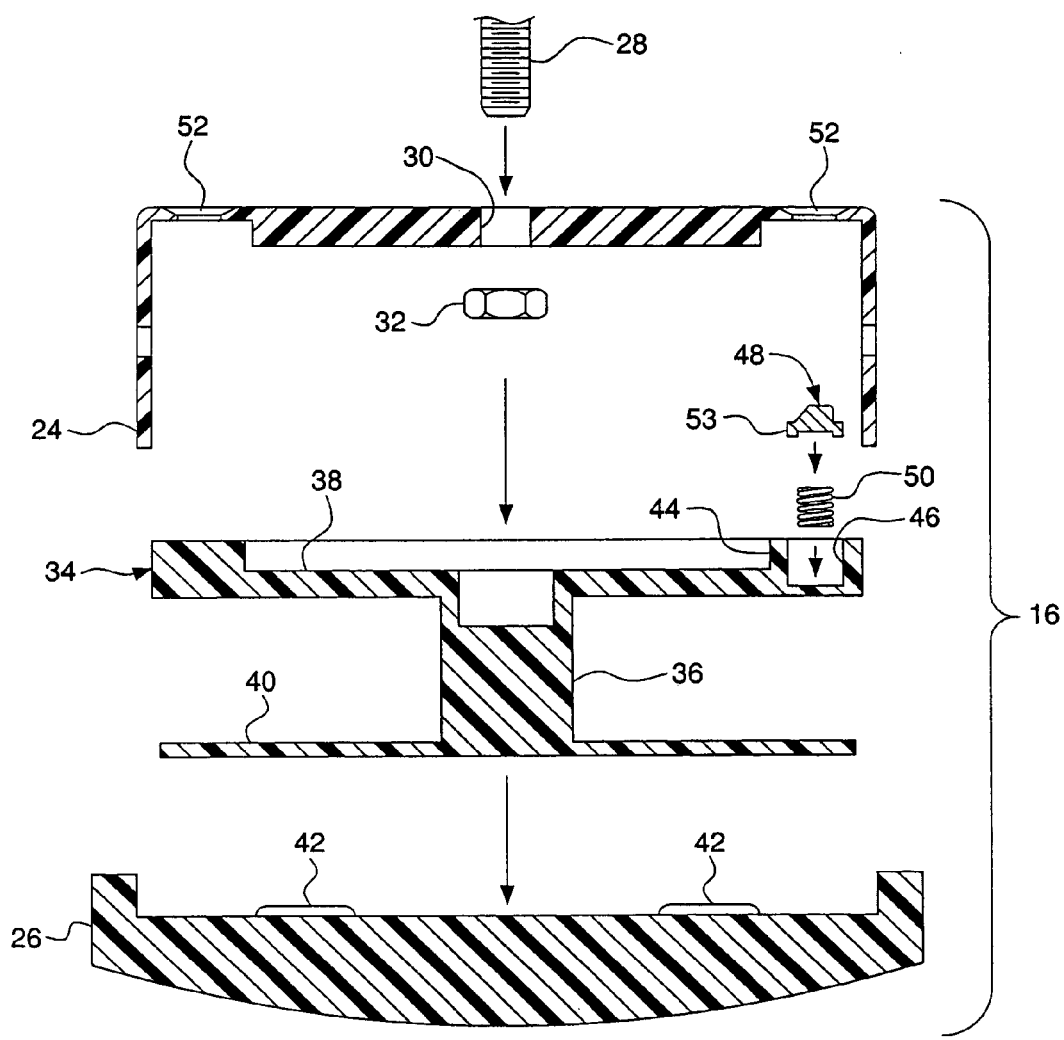
FIG. 2 is an exploded elevational view of a first embodiment of a trimmer head constructed according to the present invention.

Referring to FIG. 2 there is shown an exploded view of a first presently preferred embodiment of a trimmer head 16 according to the invention that is used for cutting vegetation in conjunction with an internal combustion engine or electric motor powered trimmer apparatus such as apparatus 10 shown in FIG. 1. Trimmer head 16 preferably comprises a rigid molded plastic first or "top" body member 24 and a rigid molded plastic second or "bottom" body member 26. Body members 24,26 may be releasably fastened to one another by a snap, threaded, J-slot or other suitable releasable connection. Together, body members 24,26 are referred to herein as the trimmer head housing. A threaded arbor of a trimmer apparatus drive shaft is identified by reference numeral 28. In order to secure body member 24 to threaded arbor 28, the threaded arbor is inserted through a central opening 30 in the top of body member 24 and a nut fastener 32 is threaded onto the arbor in the manner known in the art. As used herein, spatial terms such as "top", "bottom", "upper", "lower", etc. refer to the relative positions that the various structural components described herein would assume when trimmer head 16 is "in use," i.e., when attached to the rotating drive shaft of a conventional internal combustion or electric powered trimmer apparatus.

Figure 3:
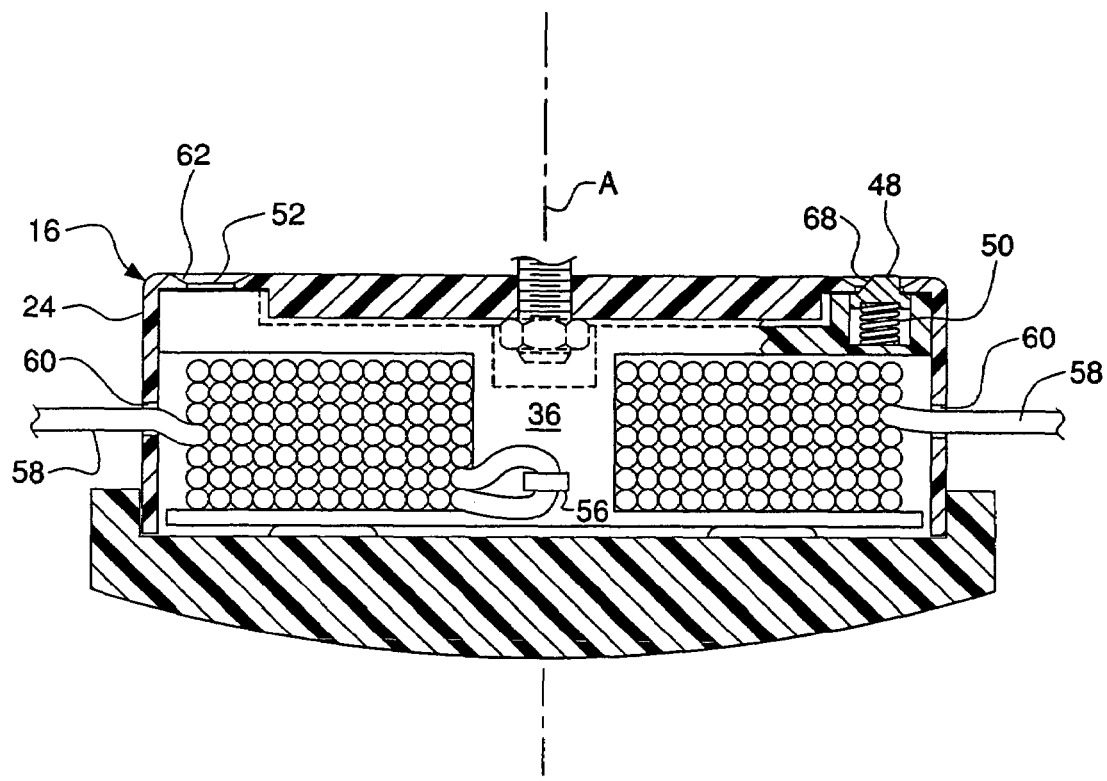
FIG. 3 is an assembled, elevational partial cross-section view of the trimmer head of FIG. 2.

Rotatably contained within the trimmer head housing is a rigid trimmer line spool 34 for carrying a coil of trimmer line in the manner shown in FIG. 3. Spool 34 comprises a cylindrical core 36 bounded on its upper and lower ends by circular disc-like flanges 38 and 40. It will be understood that spool 34 may comprise a single chamber (as shown) for carrying one coil of trimmer line or it may be divided into two or more compartments by the provision of one or more intermediate flanges between flanges 38,40 in the manner known in the art. Additionally, in order to reduce friction between the spool 34 and the trimmer head housing, the opposed interior faces of either or both of the top and body members 24,26 may be provided with thrust bearing means such as, for example, continuous or discontinuous raised formations 42. Alternatively, the thrust bearing means may be provided on either or both of the upper surface of upper spool flange 38 and the lower surface of lower spool flange 40.

Upper spool flange 38 may include an region of enlarged thickness 44 defining an upwardly open chamber 46. Alternatively, the upper flange may have a uniform thickness which is sufficient to accommodate chamber 46. The chamber receives a manually actuatable button 48 and a compressible and resilient biasing means 50 such as a mass of elastomer or, as illustrated, a compression spring, for biasing button 48 upwardly toward top body member 24. The top body member includes one or more openings 52, and button 48 includes a lower flange 53 of larger size than the opening(s) 52 to prevent dislodgement of the button from the trimmer head housing.

Figure 4:
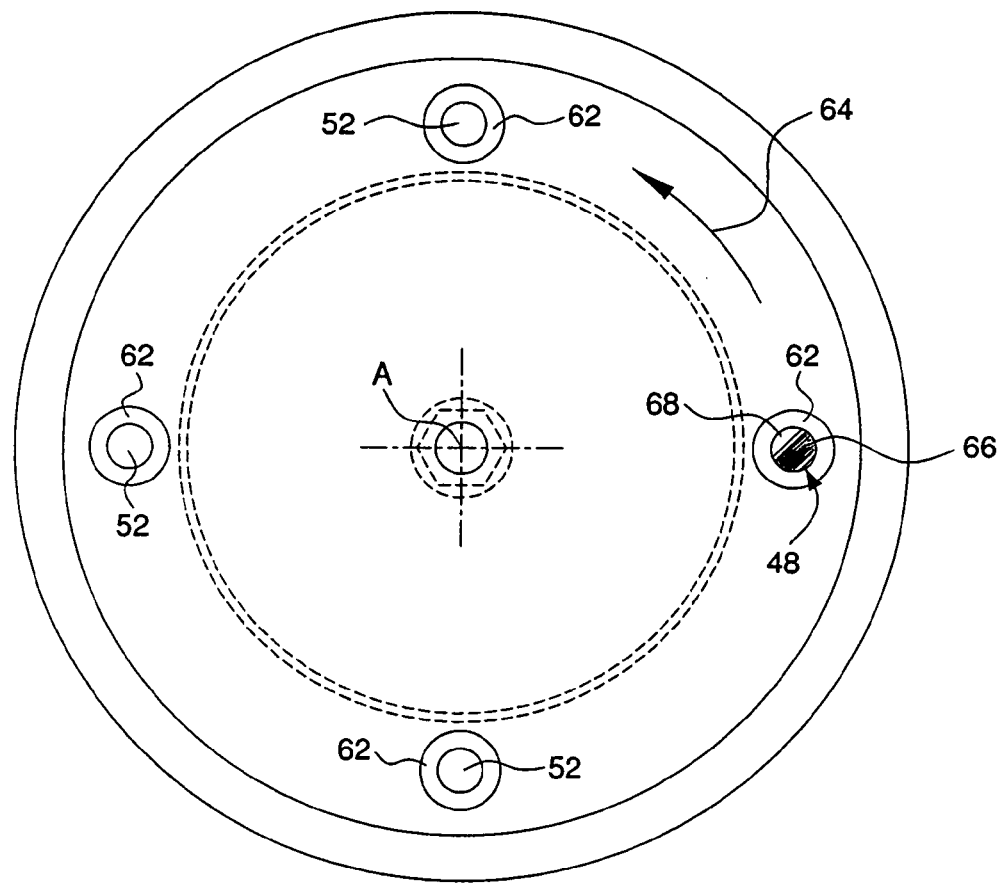
FIG. 4 is a top plan view of the assembled trimmer head of FIG. 3.

As will be more fully appreciated by reference to FIGS. 3 and 4, openings 52, together with button 48 and biasing means 50, comprise indexing means for enabling a user to selectively dispense or pay out desired lengths of trimmer line from the trimmer head 16. In addition, the central region of the spool core 36 may be provided, if necessary, with an upwardly open socket 54 to provide clearance for the distal end of arbor 28.

Turning to FIG. 3, it will be seen that spool 34 preferably includes anchorage means 56 for holding trimmer line 58 in place as a user winds a coil of line around the core 36. Anchorage means 56 may be disposed on the core, as illustrated, or on either or both of the upper and lower flanges 38, 40. The anchorage means may comprise one or more grippers for holding the end(s) of one or more lengths of trimmer line. Alternatively, the anchorage means may be in the form of an eyelet or the like, as shown, for holding a loop of trimmer line. So constructed, a single length of line may be formed into two strands that may be simultaneously wrapped about the spool core and whose ends pass through trimmer line exit ports 60 provided in the trimmer head housing.

As shown in FIGS. 3 and 4, the trimmer head housing defines a rotational axis "A" which is coaxial with the axis of rotation of the trimmer apparatus drive shaft and the axis of rotation of the spool 34 with respect to the trimmer head housing. Those figures also depict the structure and mode of operation of a first embodiment of latch and seat type indexing means according to the present invention for dispensing or paying out selected increments of trimmer line. As mentioned above, top body member 24 includes at least one opening 52 for releasably receiving the upper portion of a manually actuatable button 48. For smaller trimmer heads, i.e., up to about 4 inches in diameter, the apparatus may include one or two openings 52. For larger trimmer heads, the apparatus may include three or more openings 52. And, to facilitate guidance of a user's finger toward the button 48, the upper portion of the opening(s) 52 are preferably beveled as shown at 62.

During operation of the trimmer apparatus, trimmer line 58 becomes worn or damaged and new line must periodically be dispensed from trimmer head 16. To do this, a user depresses button 48 against the biasing force of biasing means 50 until the top of the button is below the interior face of the top body member 24. The user then pulls an exposed end of trimmer line 58 thereby causing the spool 34 to rotate about axis A as indicated by arrow 64 in FIG. 4. It will be understood that the counter-clockwise direction of arrow 64 is merely illustrative but not limitative. That is, the direction that spool 34 rotates when paying out trimmer line depends on the direction that the trimmer line is coiled about the spool core 36. Arrow 64 is merely indicative of how the button 48 orbits about axis A as it is indexed from one opening 52 to the next. When button 48 reaches the next opening 52 in its orbit, biasing means 50 forces the top of the button into latched and seated engagement with that opening, thereby locking the spool against rotation with respect to the trimmer head housing.

As most clearly seen in FIG. 4, at least a portion of the top surface of button 48 is preferably provided with ribs or other surface irregularities 66 for resisting slippage of a user's finger from the top of the button when depressing the button. Moreover, it is also desirable that a portion 68 of the sidewall of button 48 be sloped. The purpose of the sloped portion of the button sidewall is to facilitate passage of the button under and past the perimeter of the opening 52 in which the button was previously seated when it comes time to pay out fresh trimmer line. Similarly, it is also preferred that the undersurface of the top body member 24 at each opening 52 be provided with a bevel having a slope corresponding to that of the sloping button sidewall 68 for even easier passage of the button beneath the top body member. As noted above, spool 34 may rotate clockwise or counterclockwise with respect to the trimmer head housing depending on the winding direction of the trimmer line coil. To exploit this functionality to its fullest advantage, it is preferable that the button 48 be freely rotatable in relation to the biasing means 50 (or that the biasing means be freely rotatable within chamber 46 if the button and biasing means are affixed to one another) whereby a user can selectively point the sloping sidewall 68 of the button in the desired direction of spool rotation for trimmer line dispensing.

Figure 5:
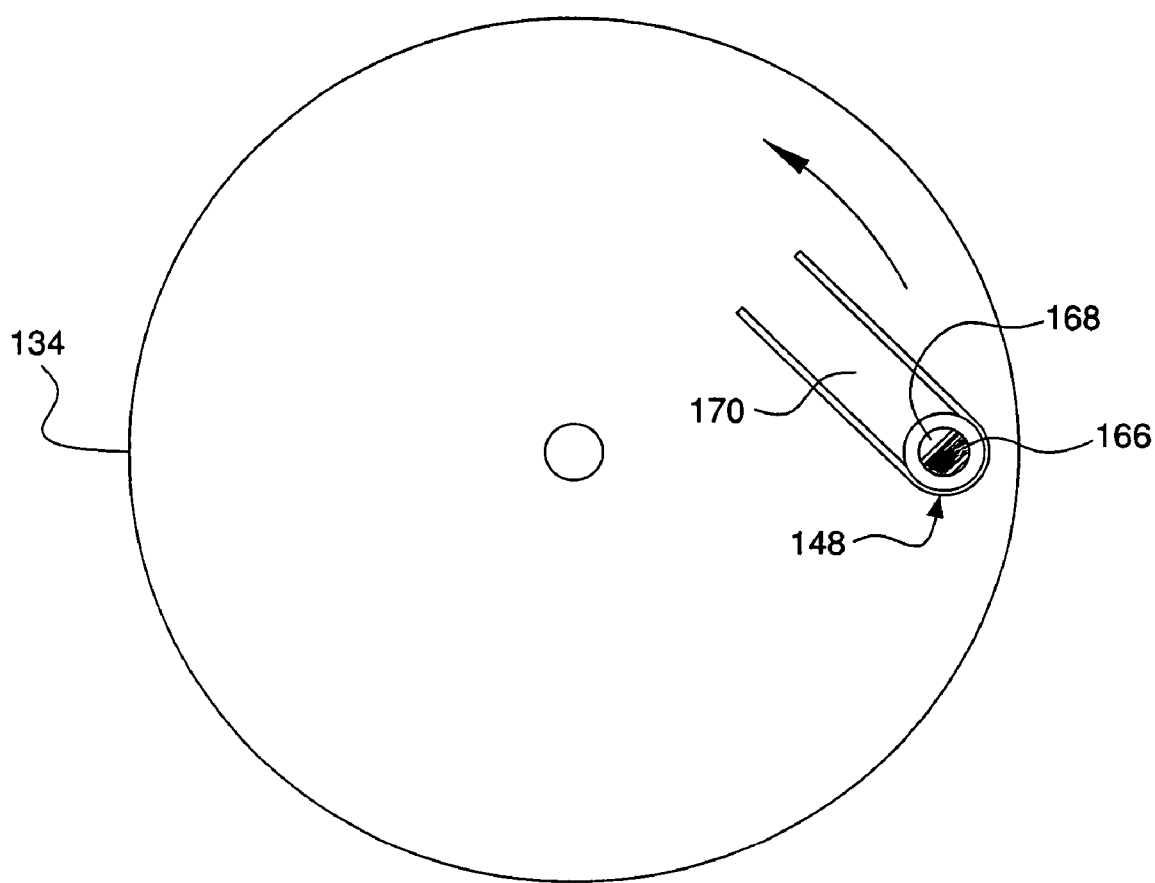
FIG. 5 is a top plan view of a further embodiment of a trimmer line spool of a trimmer head constructed according to the present invention.
Figure 6:
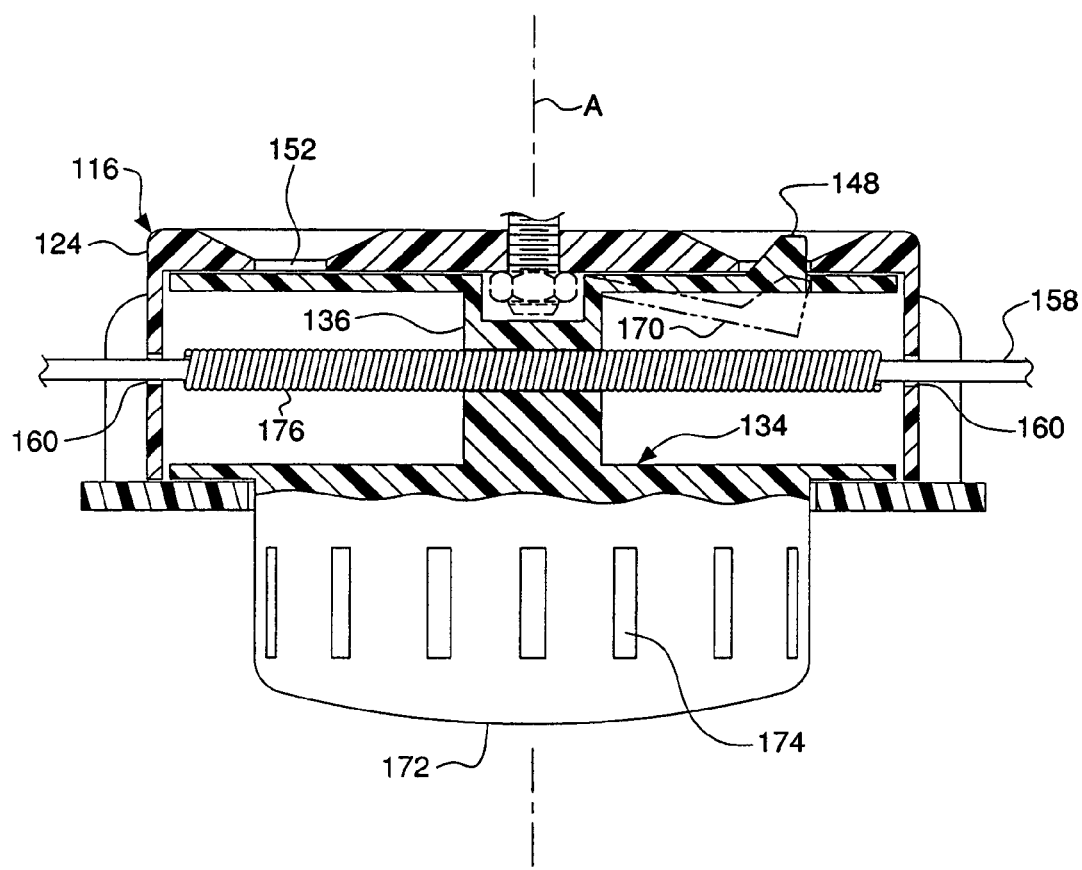
FIG. 6 is an assembled, partial cross-section view of a further embodiment of a trimmer head constructed according to the present invention that incorporates the trimmer line spool of FIG. 5.
Figure 7:
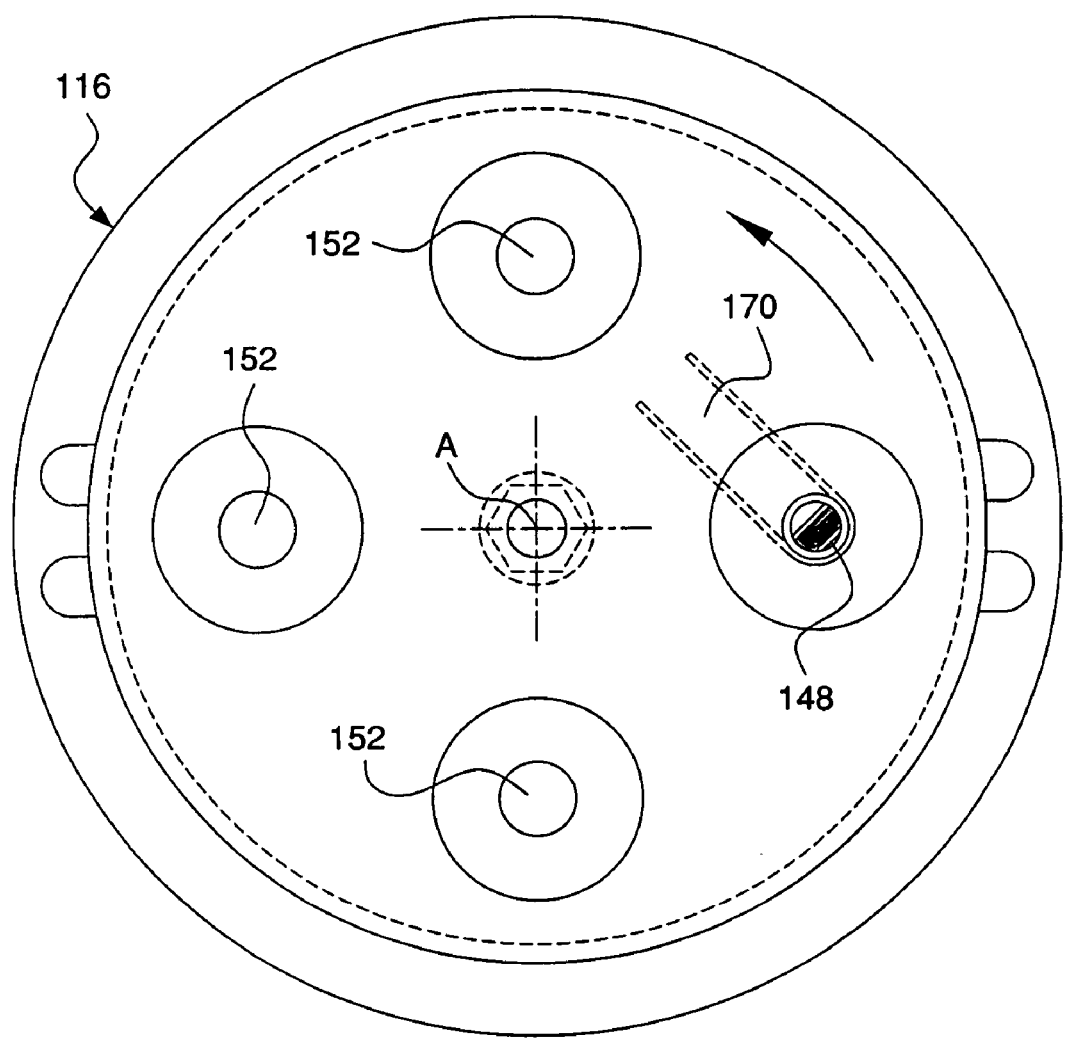
FIG. 7 is a top plan view of the assembled trimmer head of FIG. 6.

FIGS. 6 and 7 reveal an alternative embodiment of a vegetation trimmer head 116 and FIG. 5 depicts an alternative embodiment of a trimmer line spool 134 constructed in accordance with the present invention. In many respects, trimmer head 116 is very similar to trimmer opening, thereby locking the spool against rotation with respect to the trimmer head housing.

As most clearly seen in FIG. 4, at least a portion of the top surface of button 48 is preferably provided with ribs or other surface irregularities 66 for resisting slippage of a user's finger from the top of the button when depressing the button. Moreover, it is also desirable that a portion 68 of the sidewall of button 48 be sloped. The purpose of the sloped portion of the button sidewall is to facilitate passage of the button under and past the perimeter of the opening 52 in which the button was previously seated when it comes time to pay out fresh trimmer line. Similarly, it is also preferred that the undersurface of the top body member 24 at each opening 52 be provided with a bevel having a slope corresponding to that of the sloping button sidewall 68 for even easier passage of the button beneath the top body member. As noted above, spool 34 may rotate clockwise or counterclockwise with respect to the trimmer head housing depending on the winding direction of the trimmer line coil. To exploit this functionality to its fullest advantage, it is preferable that the button 48 be freely rotatable in relation to the biasing means 50 (or that the biasing means be freely rotatable within chamber 46 if the button and biasing means are affixed to one another) whereby a user can selectively point the sloping sidewall 68 of the button in the desired direction of spool rotation for trimmer line dispensing.

FIGS. 6 and 7 reveal an alternative embodiment of a vegetation trimmer head 116 and FIG. 5 depicts an alternative embodiment of a trimmer line spool 134 constructed in accordance with the present invention. In many respects, trimmer head 116 is very similar to trimmer head 16 described above. Accordingly, only those features that depart materially in structure and/or function from their counterparts in FIGS. 2-4 or are otherwise necessary for a proper understanding of the invention will be described in detail in connection with FIGS. 5-7.

Referring to FIG. 5, there is shown a top view of a trimmer line spool 134 adapted for use in the trimmer head 116 shown in FIGS. 6 and 7. According to this embodiment, the biasing means of the latch means comprises a resilient tab 170 attached to or, preferably, formed integrally with the spool 134. The proximal end of tab 170 is connected to the spool and the distal end thereof carries a raised latch button 148 which is preferably similar in many respects to button 48 described above. That is, button 148 preferably includes finger slip resistant means 166 and sloped wall 168 similar in structure and function to their counterpart elements 66 and 68.

A trimmer head housing must be formed of high strength and rugged plastic in order to withstand the impact forces typically encountered when trimming grass, brush and other vegetation. Such plastics are very rigid. If the tab 170 and its button 148 are formed integrally with spool 134, then the entire spool must be fabricated from plastic material having less rigidity than the housing. More specifically, the material selected for the spool must be such that tab 170 flexes downwardly upon depression of button 148 (shown in dashed line in FIG. 7) yet reliably and instantaneously returns to its unflexed position when it encounters an opening 152 provided in the top body member 124 (FIGS. 6 and 7) whereby it latches into seated engagement in the opening and locks the spool against rotation. Thus, when dispensing trimmer line, the indexing means of FIGS. 5-7, including resilient tab 170 and openings 152, function essentially the same as their counterparts in FIGS. 2-4.

Although the latch and seat trimmer line indexing means shown in FIGS. 2-7 represent the presently preferred embodiments thereof, it is contemplated that other designs could be employed. For instance, the latch member could be carried by the trimmer head housing and the latch seat opening(s) could be provided in the trimmer line spool. And, the latch mechanism could be located on the bottom of the trimmer head rather than on the top. Regardless of their actual construction, however, the trimmer line indexing means of the present invention comprise cooperating latch and seat structure carried by the trimmer head housing and the trimmer line spool whereby one element of the mechanism, either latch or seat, orbits about the central axis A of the trimmer head when trimmer line is paid out from the trimmer head.

Figure 8:
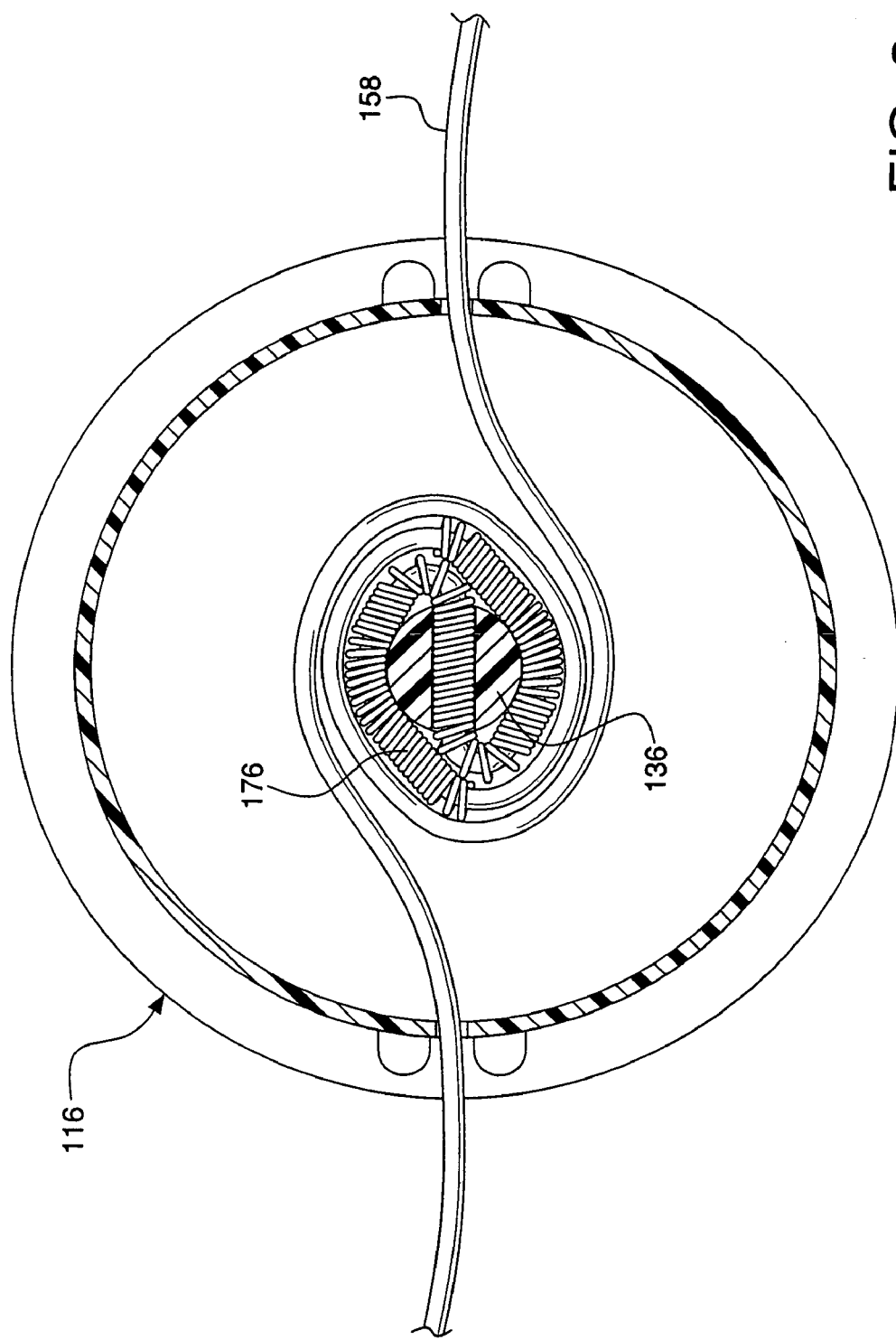
FIG. 8 is a top plan view of the trimmer head of FIGS. 6 and 7 with certain elements omitted for clarity and depicting manner by which trimmer line is coiled about the spool.

FIGS. 6 and 8 also show another preferred feature of the present invention, namely, a system for rapidly loading a coil of trimmer line onto the core of a trimmer line spool, e.g., line 158 onto core 136 of spool 134, without removing the spool from the trimmer head housing. The rapid loading system is useful not only in fully manual trimmer heads such as those thus far described, but it may also be incorporated into semi-automatic (i.e., bump indexing) and fully automatic varieties as well.

In particular, spool 134 includes an integral knob or the like 172 that projects through an aperture provided in the bottom body member 126. Knob 172 is preferably provided with a plurality of raised formations 174 about its periphery to enhance a user's grip as he or she rotates the knob. The turning torque created by the spool core is required in order to wind trimmer line onto the spool. That is, a length of line must be inserted in a first trimmer line exit port 160, then passed through the spool core 136 and out of the opposing exit port 160 before the line can be wound onto the spool. Trimmer line 158 (or 58) may be any commercially available flexible monofilament plastic trimmer line of any suitable type and cross-sectional configuration, e.g., 0.065, 0.080, 0.095, 0.105, 0.12, 0.13 or 0.15 gauge nylon trimmer line or the like, which is currently used in conventional vegetation trimmer apparatus. Such line is inherently flexible; indeed, the smaller gauge lines are quite supple. Limp lines would be difficult to thread across trimmer head housings which may range up to 5 inches or more in diameter. Because of this, a need exists for a way to assure that the trimmer line is supported throughout its passage through the trimmer head.

Accordingly, the trimmer head shown in FIG. 6 also desirably includes trimmer line guide means 176 which preferably passes through the spool core 136 and substantially spans the inner diameter of the trimmer head housing. Trimmer line guide means 176 is a flexible yet resilient tubular member that has sufficient elastic memory to return to the straight configuration shown in FIG. 6 when it is necessary to coil new trimmer line onto the spool 134. A tubular member having both high flexibility and high resilience is ideal for this purpose because it must be straight when the trimmer line is being threaded through the trimmer head, as shown in FIG. 6, and it should yield to substantially conform to the shape of the spool core 136 when the coil is being wrapped around the core, as shown in FIG. 8. A presently preferred example of trimmer line guide means 176 according to the invention is a coil spring.

The yieldable trimmer line guide means 176 offers several important advantages over the rigid trimmer line guide tube described in U.S. Pat. No. 5,765,287. It urges the initial windings of the trimmer line coil around the spool core in gentle arcs rather than sharp turns as winding is commenced. And, because it conforms to the spool core during winding, it does not present an obstruction in the spool chamber that would hinder uniform and compact winding of the trimmer line onto the spool. Further, it presents no sharp edges that could damage or sever the trimmer line during winding.

Referring to FIGS. 9A-14, there is shown a further embodiment of trimmer head according to the invention which is identified generally by reference numeral 216. Trimmer head 216 preferably comprises a rigid molded plastic first or "top" body member 224 and a rigid molded plastic second or "bottom" body member 226. Together, body members 224,226 are referred to herein as the trimmer head housing. Body members 224,226 may be releasably fastened to one another by a snap, threaded, J-slot or other releasable connection. For example, suitable fastening means may include generally stiff yet resilient tabs 225*a* (FIGS. 11A and 11B) upwardly projecting from the circumferential wall of body member 226. Tabs 225*a* are adapted to pass through correspondingly shaped apertures 225*b* (FIGS. 10A-10C). At their upper ends tabs 225*a* preferably have radially outwardly directed lips 225*c*. As tabs 225*a* are inserted through apertures 225*b*, the tabs flex radially inwardly until such time that lips 225*c* pass completely through the apertures whereby the tabs assume their unflexed positions and the lips 225*c* latchingly engage body member 226 with body member 224. Alternatively, it will be understood that the lipped tabs 225*a* or similar structure may be carried by the first body member 224 and corresponding slots may be provided, where appropriate, in the circumferential wall or the end wall of the second body member 226 in order to achieve the desired latching engagement between the first and second body members of the trimmer head housing.

Figure 11A:
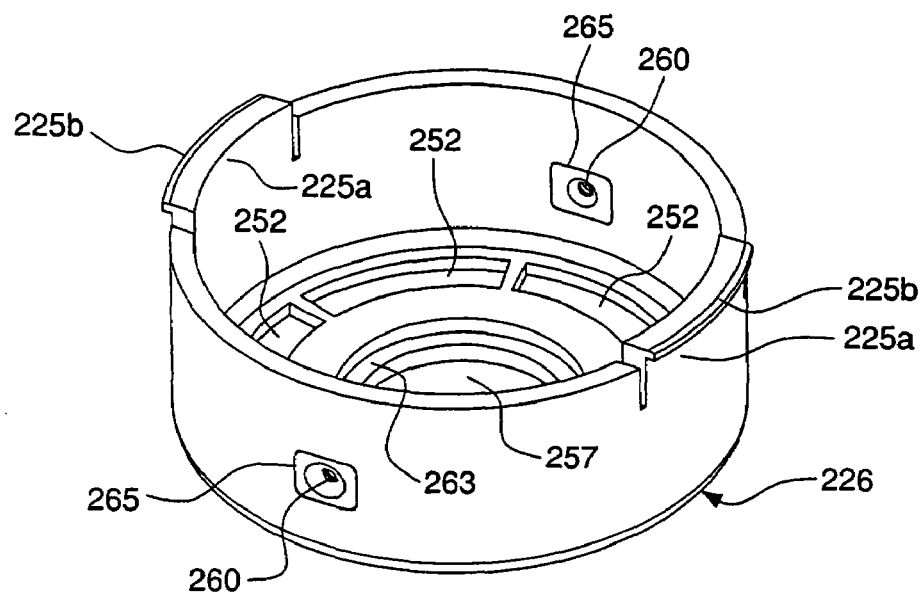
FIGS. 11A and 11B are top perspective and top plan views, respectively, of a second trimmer head housing body member of the trimmer head shown in FIGS. 9A and 9B.
Figure 11B:
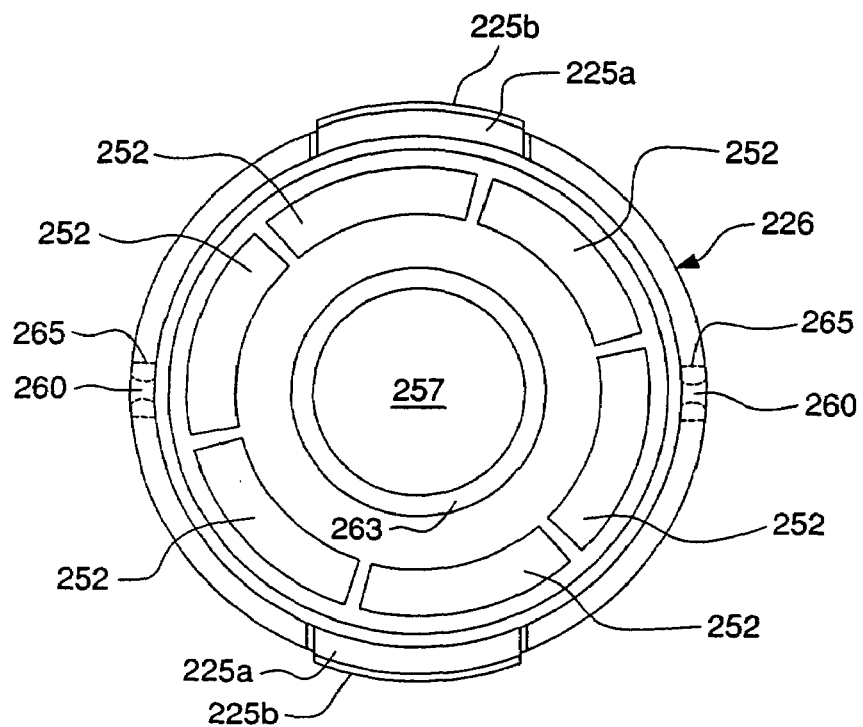

Also shown in FIGS. 11A and 11B are trimmer line exit ports 260 through which trimmer line passes when loading trimmer line into and discharging trimmer line from trimmer head 216 in the manner described hereinafter. Preferably, ports 260 are provided in diametrically opposed metal eyelets 265 that are embedded into the circumferential wall of second body member during formation thereof. Ports 260 are preferably provided with a gently curved contour to reduce breakage of the trimmer line during operation of trimmer head 216.

Figure 9A:
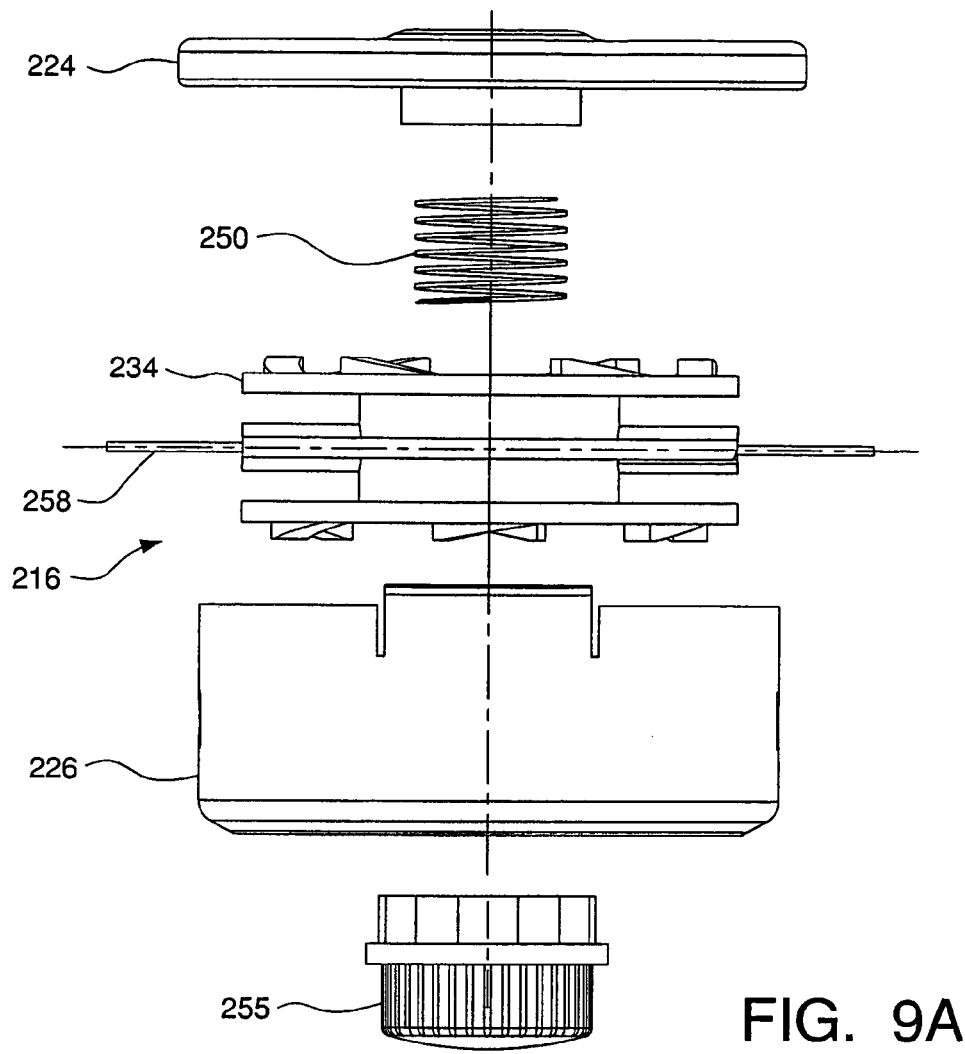
FIG. 9A is an exploded elevation view of a further embodiment of a trimmer head constructed according to the present invention.
Figure 9B:
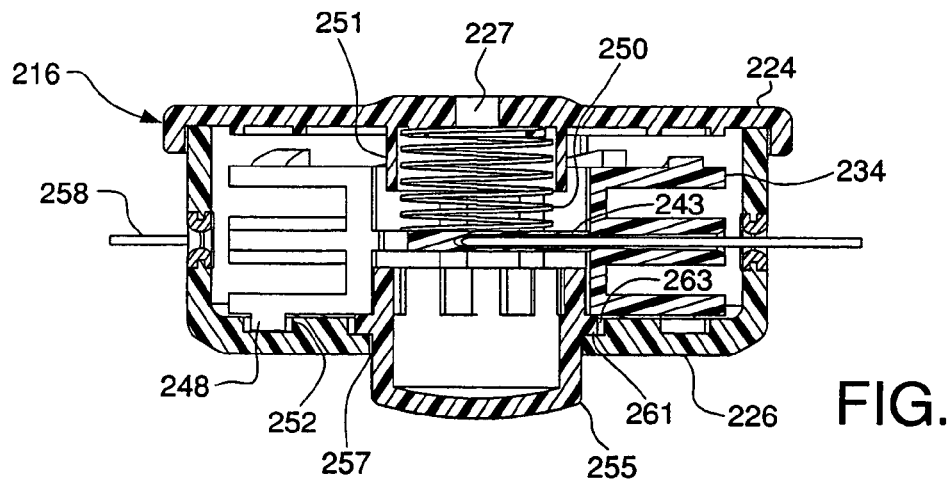
FIG. 9B is an assembled, elevational partial cross-section view of the trimmer head of FIG. 9A.
Figure 10A:
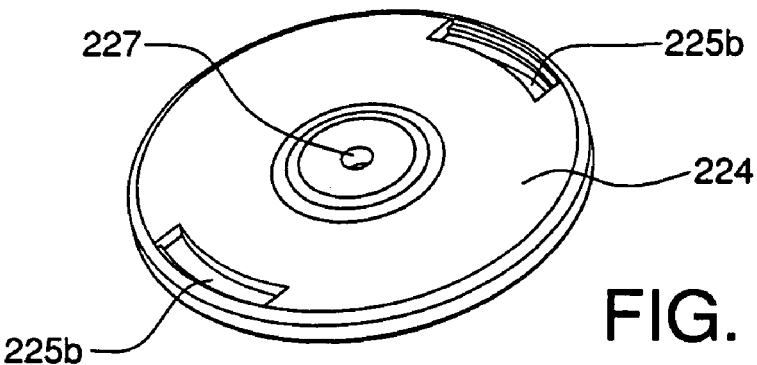
FIGS. 10A, 10B and 10C are top perspective, bottom perspective and bottom plan views, respectively, of a first trimmer head housing body member of the trimmer head shown in FIGS. 9A and 9B.
Figure 10B:
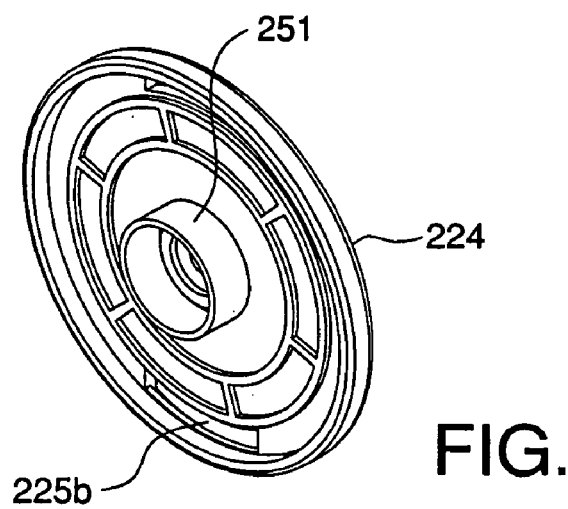
Figure 10C:
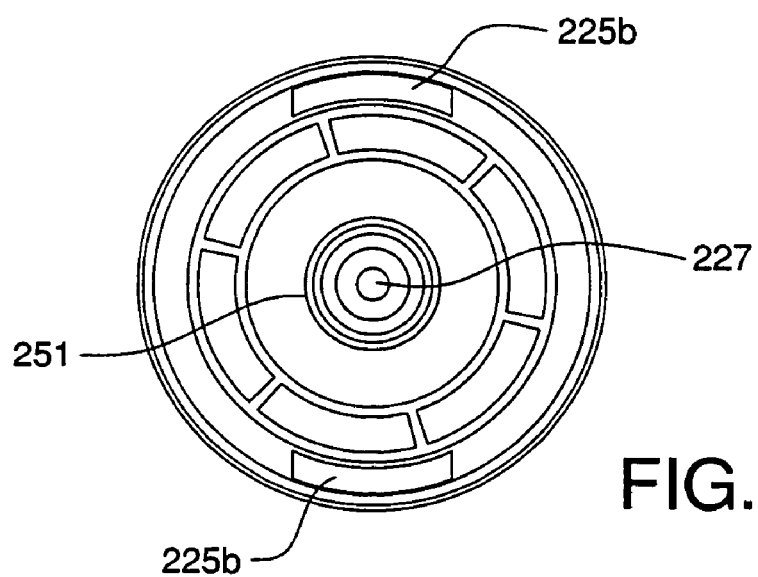

As depicted in FIGS. 9B, 10A, and 10C, body member 224 includes a central opening 225. Prior to assembly of trimmer head 216, the threaded arbor of a trimmer apparatus drive shaft is inserted through opening 227 and a nut fastener is threaded onto the arbor and secures body member 224 to the threaded arbor as described above in connection with FIGS. 2 and 3. Trimmer head 216 further includes a trimmer line spool 234 that is rotatably supported in the trimmer head housing. Spool 234 comprises a cylindrical core 236 bounded on its first and second (upper and lower) ends by circular disc-like flanges 238 and 240. According to this embodiment, spool 234 comprises a multiple chamber spool. That is, it is divided into two chambers or compartments by the provision an intermediate flange 241 located between flanges 238,240. Intermediate flange 241 is preferably coplanar with abutment means 243 (FIGS. 12A and 12B), discussed below, provided within the core 236 of spool 234. Abutment means 243 serves as an abutment or seat for resilient biasing means 250, e.g., a compression spring or the like, in a manner described below.

In addition to biasing means 250, the latch means according to the embodiment of trimmer head 216 illustrated in FIGS. 9A-14 comprise at least one projection 248 carried by one of the trimmer head housing and spool 234. The projection(s) cooperate with seat means in the form of at least one recess carried by the other of the trimmer head housing and the spool. Together the latch means and seat means function as indexing means to enable a user to selectively discharge trimmer line from the spool when desired or necessary. According to a presently preferred embodiment most clearly illustrated in FIGS. 12A, 12B and 13A-13C, projection(s) 248 assume the form of generally arcuate wedge shaped formation(s) provided on the outer faces of both of the trimmer spool end flanges 238,240. Each formation includes a substantially vertical stop surface 248*a* and a sloped or inclined cam or glide surface 248*b*. Preferably, the formation(s) are molded integrally into spool 234 at the time of its manufacture. In a presently preferred embodiment most clearly illustrated in FIGS. 11A and 11B, projection(s) 248 are adapted to cooperate with seat means in the form of generally arcuate depressions 252 provided on the inner face of the closed end of second trimmer housing body member 226. A projection 248 received in a depression 252 is shown in FIG. 9B. It will be understood that the relative positions of the projection(s) 248 and depression(s) 252 may be reversed. That is, suitable sloped projection(s) may be provided in the inner faces of the first and second body member 224,226 and cooperating depression(s) may be formed in the outer faces of both of the trimmer spool end flanges 238,240. Such a construction would require both of the first and second body members 244,226 to include a central opening 257, described below, in order to enable selective mounting of either of the body members to the threaded arbor of a trimmer apparatus.

Projection(s) 248 are normally retained in depression(s) 252 under the influence of the compression force of biasing means 250. As reflected in FIGS. 9B, 10B and 10C, in order to maintain biasing means 250 in stable orientation during operation of trimmer head 216, it is desirable that the bottom surface of first body member 224 be provided with a protruding ring or collar 251 the function of which is described below.

In presently available trimmer head assemblies wherein trimmer line may wound onto a spool without removing the spool from the spool housing, trimmer line may only be practically wound on the spool in one direction, either clockwise or counterclockwise. In contrast, trimmer line spool 234 may be received in the trimmer head housing with either spool flange 238 or spool flange 240 in operative engagement with the inner surface of the closed end of the second body member 226. That is, spool 234 may be selectively placed in a desired disposition (and thereafter inverted or flipped over should the user find that disposition to be incorrect) depending on the direction of rotation of the drive shaft of the trimmer apparatus with which trimmer head 216 is intended to be used. Accordingly, the cam surface(s) 248*b* of the projection(s) 248 on the flanges 238,240 are inclined in such a way that spool 234 is capable of practical rotation in one direction (e.g., counterclockwise) when first flange 238 faces upwardly and practical rotation in the opposite direction (e.g., clockwise) when second flange 240 faces upwardly. With this capability, trimmer head may be effectively used with essentially any powered vegetation trimmer, regardless of whether the trimmer's drive shaft rotates clockwise or counterclockwise.

Figure 12A:
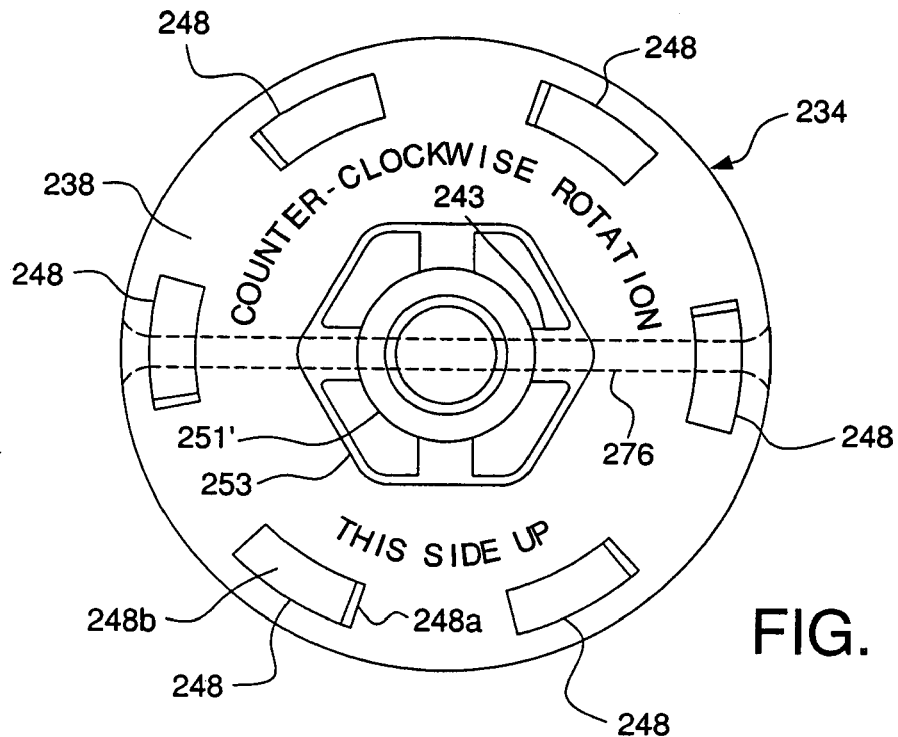
FIGS. 12A and 12B are opposite plan views of a trimmer head spool of the trimmer head shown in FIGS. 9A and 9B.
Figure 12B:
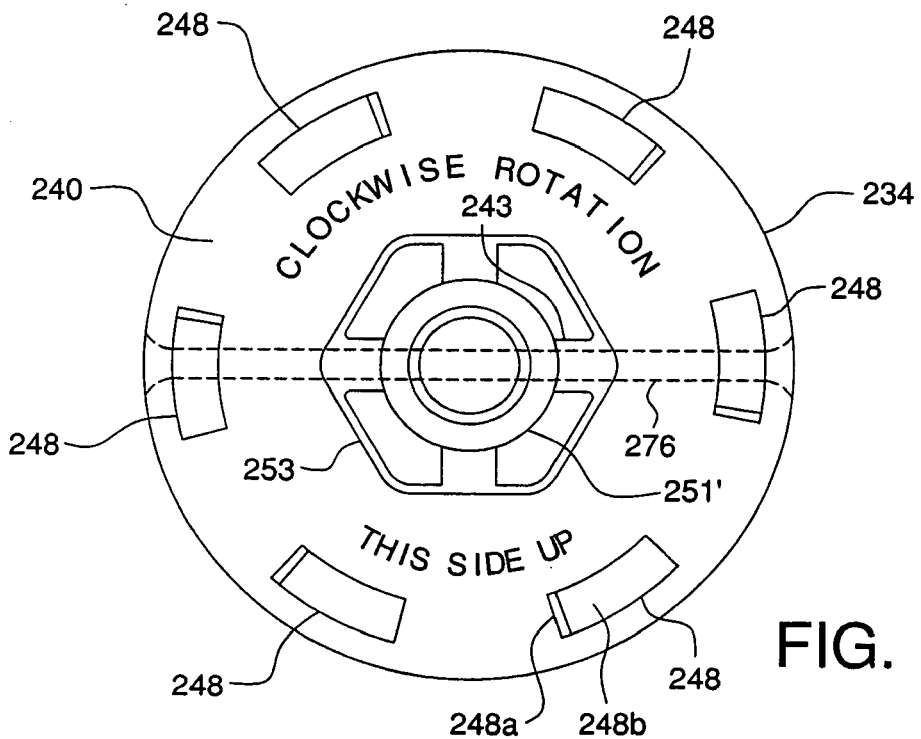
Figure 13A:
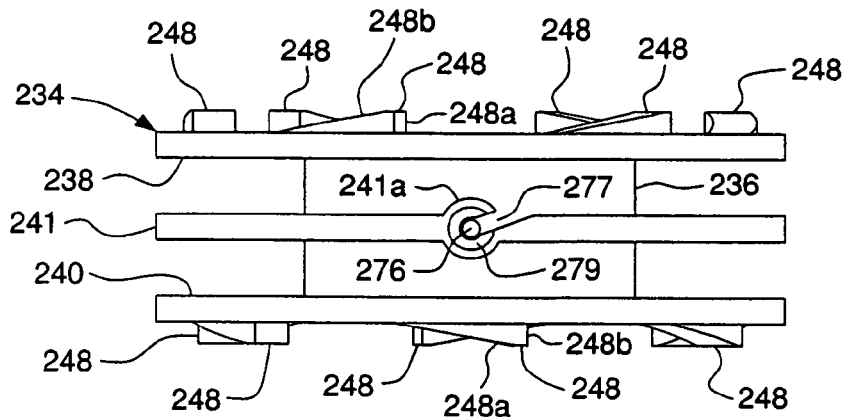
FIG. 13A is an elevation view of the trimmer head spool of the trimmer head shown in FIGS. 9A and 9B corresponding to the plan view shown in FIG. 12A.
Figure 13B:
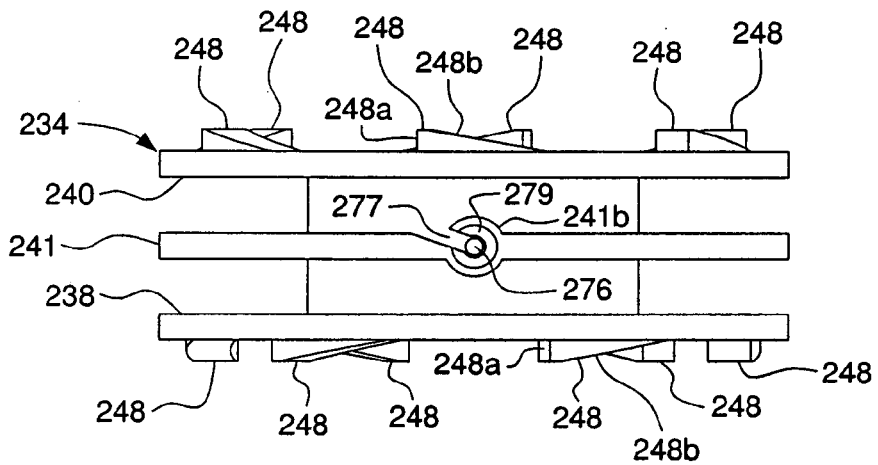
FIG. 13B is an elevation view of the trimmer head spool of the trimmer head shown in FIGS. 9A and 9B corresponding to the plan view shown in FIG. 12B.
Figure 13C:
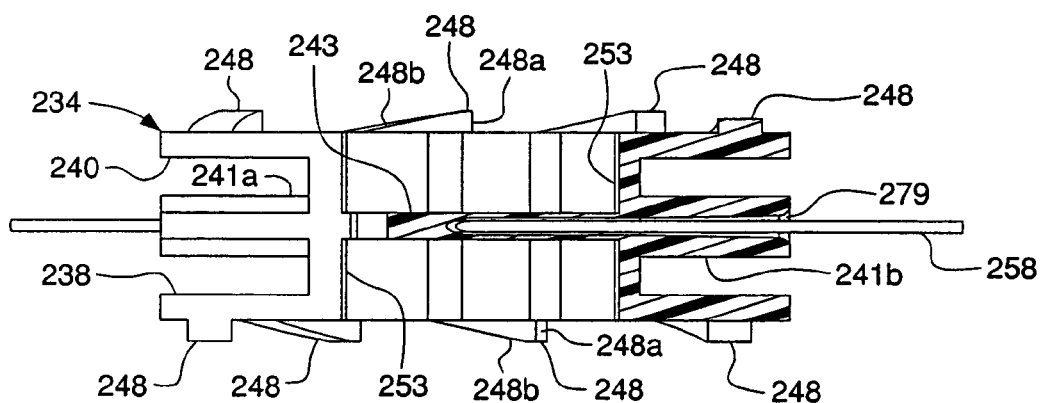
FIG. 13C is an elevational partial cross-scetion view of the trimmer head spool of the trimmer head shown in FIGS. 9A and 9B corresponding to the plan view shown in FIG. 12B.
Figure 14:
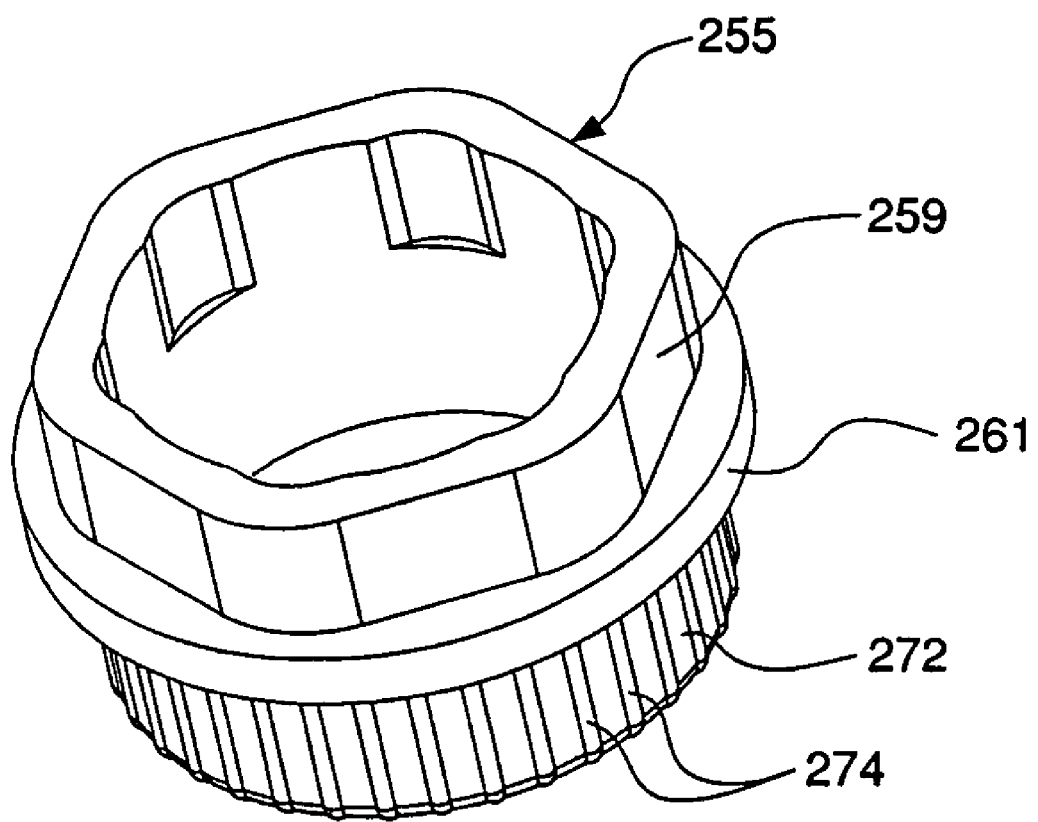
FIG. 14 is a top perspective view of a trimmer spool turning member of the trimmer head shown in FIGS. 9A and 9B.

Referring to FIGS. 12A, 12B and 13C, it will be seen that, extending inwardly from the outer surfaces of spool flanges 238, 240 and terminating at abutment means 243 is a pair of opposed sockets 253. In the illustrated embodiment, sockets 253 have a generally hexagonal shape. Referring to FIG. 14, there is shown a trimmer spool turning member 255 suitable for enabling a user to wind trimmer line onto spool 234. Trimmer spool turning member 255 comprises a knob portion 272 that is adapted to project through a central aperture 257 (FIGS. 11A and 11B) in the second body member 226 provided in the bottom body member 126. Knob portion 272 is preferably provided with a plurality of raised grip enhancing formations 274 about its periphery similar in structure and function to raised formations 174 described above in connection with FIG. 6. Trimmer spool turning member 255 further comprises a drive portion 259 which is separated from knob portion 272 by a radially outwardly directed flange 261. Flange 261 is adapted to rest against the inner face of the closed end of the second body portion 226. Preferably, the inner face of the closed end of the second body portion surrounding central aperture 257 is provided with a circular seat 263 (FIGS. 11A and 11B) which is dimensioned to closely receive knob flange 261 in the manner shown in FIG. 9B. Drive portion 259 is sized and shaped to essentially matingly cooperate with sockets 253 of trimmer line spool 234. In the illustrated embodiment, therefore, the drive portion 259 of trimmer spool turning member 255 is generally hexagonal in shape to permit its insertion into either of the sockets. It will be appreciated, however, that the mating sockets 253 and drive portion 259 are not limited to any particular shape. Indeed, they may assume any mating shape other than a purely circular configuration that will effectuate rotation of spool 234 by rotation of knob portion 272.

Assembly of trimmer head 216 is as follows. A user first inserts the knob portion 272 of trimmer spool turning member 255 until knob flange 261 comes to rest against the inner face of the closed end of the second body portion 226. He or she then places trimmer line spool 234 into the second body portion 226 while bringing one of the sockets 253 into mating engagement with the drive portion of trimmer spool turning member 255. When inserting the spool, the user must take care to face either spool flange 238 or spool flange 240 upwardly depending on whether it is desired to wind trimmer line either clockwise or counterclockwise onto the spool (the direction of winding is dictated by the direction of rotation of the trimmer apparatus drive shaft: if the drive shaft rotates counterclockwise, then the trimmer line winding direction is clockwise, and vice versa). Biasing means 250 is then placed into the open upwardly facing socket 253 and first body member 224 is brought into closing engagement with second body member 226. Each socket 253 is preferably provided with a protruding ring or collar 251' which cooperates with the protruding ring or collar 251 of first body member 224 in order to prevent lateral shifting or misalignment of biasing means 250 during operation of the trimmer head 216. If the user errs in properly placing the spool within the trimmer housing, the body member 224,226 may be separated to permit the spool to be inverted into the proper disposition.

Referring again to FIGS. 12A-13C, it will be seen that spool 234 includes a trimmer line guide means 276 formed coplanar with intermediate spool flange 241. Trimmer line guide means 276 is desirably a continuous passageway passing from a first enlarged portion 241a of intermediate spool flange 241 (FIGS. 13A and 13C) through abutment means 243 (FIGS. 12, 12B and 13C) and through a second enlarged portion 241b of intermediate spool flange 241 (FIGS. 13B and 13C). As seen in FIGS. 13A and 13B, the passageway of trimmer line guide means 276 communicates with oppositely oriented guide openings 277 in the first and second enlarged portions 241a and 241b of intermediate flange 241 that are constructed and arranged to ensure that trimmer line is properly wound either clockwise or counterclockwise on both chambers of spool 234 during loading of trimmer line onto the spool. Also, it is preferable that the opposite open ends of the passageway of trimmer line guide means 276 be funnel or flare shaped, as at 279 (FIGS. 13A-13C) to facilitate insertion of trimmer line into the passageway. In order to load trimmer line 258 into trimmer head 216, the passageway of trimmer line guide means 276 is first brought into alignment with trimmer line exit ports 260. Then, an end of the trimmer line is inserted into one port 260 and passed through trimmer line guide means 276 until it passes out of the opposite exit port 260. The trimmer line should then be adjusted so that approximately equal lengths of line project from each exit port. The user then winds the knob portion 272 of the trimmer spool turning member 255 in the proper direction, either clockwise or clockwise, to draw the line into the housing and wind it onto the chambers of spool 234. The sloped surfaces 248b of projections 248 assure that the spool 234 is easily displaced against the biasing force of biasing means 250 during a line loading operation without the user having to exert additional force to displace the spool. As is known in the art, the substantially vertical stop faces 248a of projections 248 prevent uncontrolled discharge of trimmer line during vegetation trimming.

Trimmer head 216 is a bump indexing variety of trimmer head. That is, it permits user-controlled discharge of trimmer line utilizing the centrifugal force generated by the rapidly rotating head. More particularly, when the bottom of knob portion 272 of the trimmer spool turning member 255 is tapped against a hard surface, the biasing force of biasing means 250 is momentarily overcome, whereby the substantially vertical stop faces 248a of projections 248 are momentarily displaced from contact with the corresponding substantially vertical stop faces of depressions 252. During this brief instant, centrifugal force cause trimmer line 258 to be discharged through exit ports 260. Thereafter, the biasing means 250 re-seats the spool into engaging contact between the stop faces 248a of projections 248 and their counterparts in depressions 252. It is also possible to use trimmer head 216 in a fully manual mode. As such, when the user desires to extract trimmer line from the head, he or she brings trimmer head to a complete stop, pushes the knob portion 272 inwardly against the biasing force of the biasing means while turning the knob and extracting the desired length of line from the spool. When sufficient line has been discharged, the user releases the knob and resumes trimming.

Referring to FIGS. 15-20C, there is shown a further embodiment of trimmer head according to the invention which is identified generally by reference numeral 316. Trimmer head 316 is in may respects similar in structure and function to trimmer head 216 described above. Accordingly, only those features that depart materially in structure and/or function from their counterparts in FIGS. 9A-14 or are otherwise necessary for a proper understanding of the invention will be described in detail in connection with FIGS. 15-20C.

The primary distinction between trimmer head 216 and trimmer head 316 is that the former employs a unitary trimmer line spool and the latter utilizes a multi-component trimmer line spool, identified generally by reference numeral 334.

More specifically, trimmer line spool 334 is preferably constructed as a three-part assembly that may be assembled as desired to create a two-chamber spool that is capable of loading trimmer line in either a clockwise or counterclockwise direction of rotation.

Figure 15:
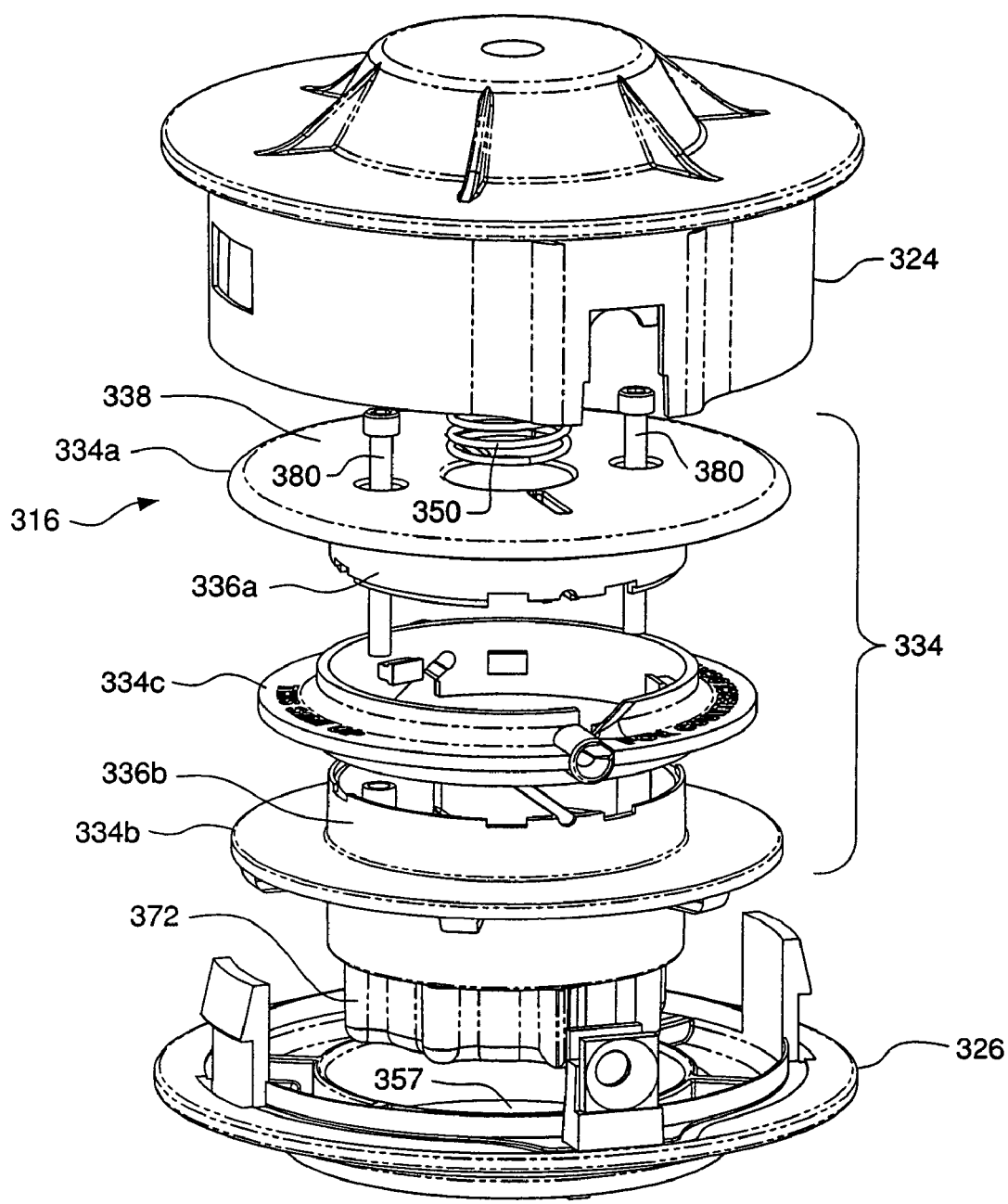
FIG. 15 is an exploded perspective view of a further embodiment of a trimmer head constructed according to the present invention.
Figure 16:
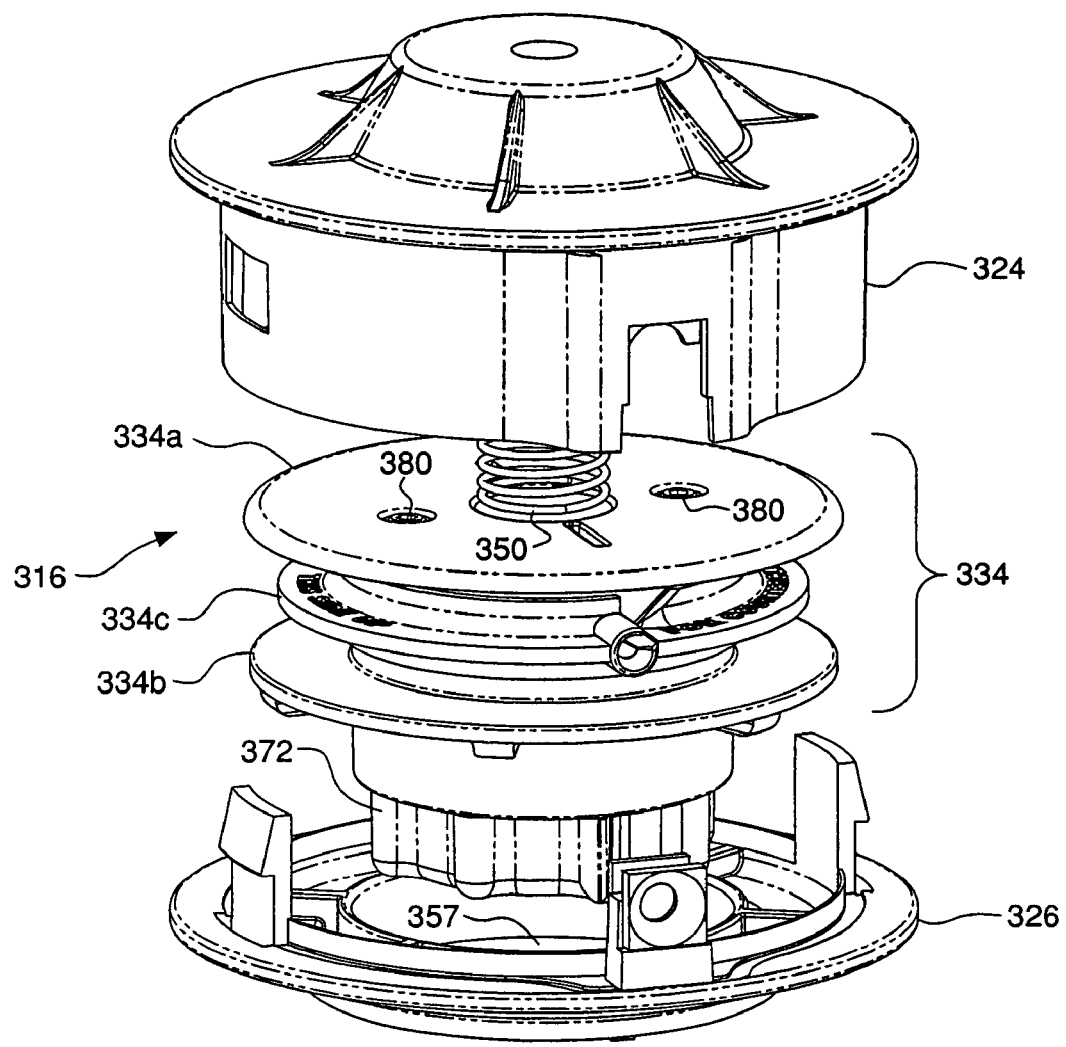
FIG. 16 is a partially assembled exploded perspective view of the trimmer head of FIG. 15.
Figure 17:
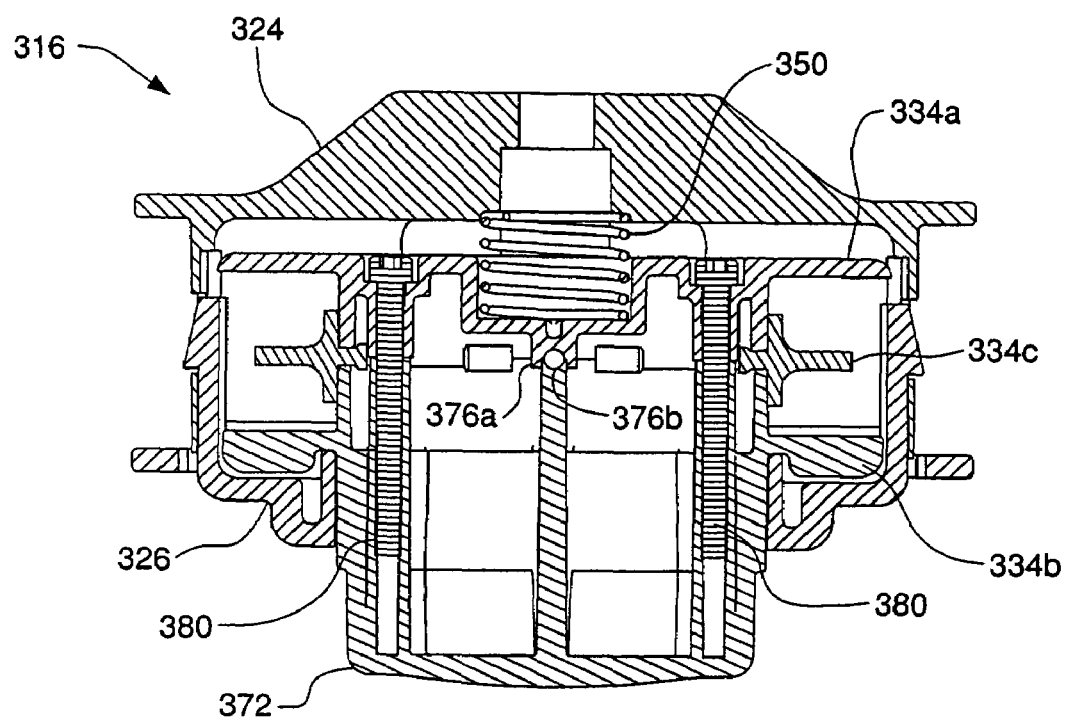
FIG. 17 is an elevational cross-section view of the trimmer head of FIG. 15.

As illustrated in FIGS. 15-17, spool 334 includes an upper spool member 334a which defines an upper disc-like flange 338 and an upper core portion 336a. Likewise, spool 334 includes a lower spool member 334b which defines a lower disc-like flange 340 and a lower core portion 336b. Preferably, a knob 372 is integrally attached to the bottom of lower spool member 334b. Spool 334 further comprises an intermediate collar member 334c disposed between the upper and lower spool members 334a,334b. Releasable fastening means 380 such as a pair of screws or the like permit selected assembly, disassembly and reassembly of spool members 334a-334c to produce a spool assembly that can coil trimmer line either clockwise or counterclockwise.

Figure 20A:
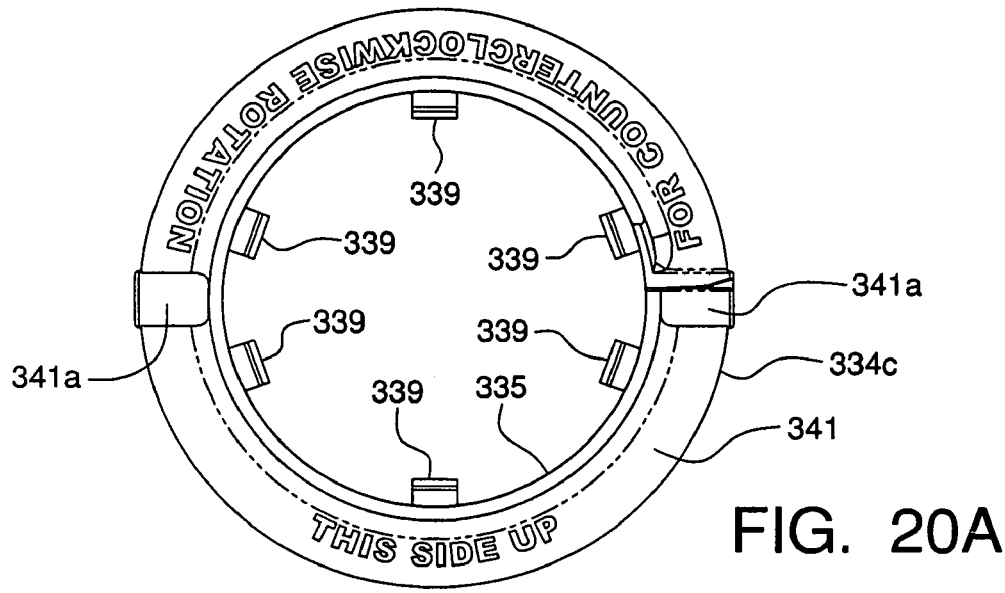
FIG. 20A is a first plan view of a reversible intermediate trimmer spool flange of the trimmer spool of the trimmer head of FIG. 15.
Figure 20B:
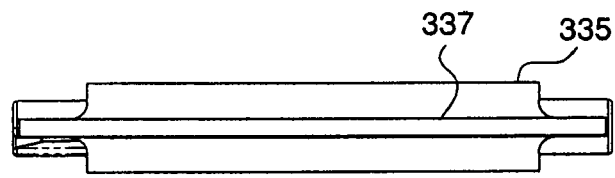
FIG. 20B is an elevation view of the reversible intermediate trimmer spool flange of FIG. 20A.
Figure 20C:
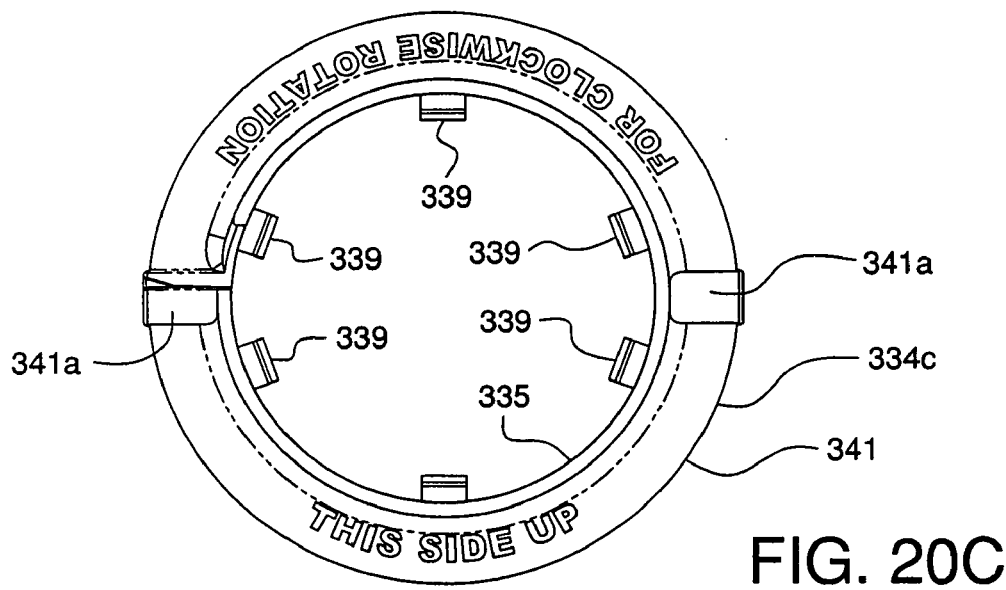
FIG. 20C is a second plan view of a reversible intermediate trimmer spool flange of FIG. 20A, wherein the second plan view is opposite the plan view shown in FIG. 20A.

Details of a presently preferred configuration and features of intermediate collar member 334c are provided in FIGS. 20A-20C. As illustrated in FIGS. 20A and 20C, one side or the other of member 334c will face upwardly depending on the direction the user choose to wind trimmer line on the trimmer spool. Member 334c is an annular member and includes a vertical cylindrical wall 335 and a horizontal flange 341 projecting radially outwardly from wall 335. Flange 341 functions as an intermediate flange that divides spool 334 into two distinct trimmer line receiving chambers. Formed into flange 341 is a pair of diametrically opposed enlarged portions 341a which, along with certain structure of upper and lower spool members 334a,334b described below, form trimmer line guide means extending coplanar with intermediate spool flange 341. Enlarged flange portions 341a include oppositely oriented guide openings, similar to openings 277 described above in connection with FIGS. 13A and 13B, that are constructed and arranged to ensure that trimmer line is properly wound either clockwise or counterclockwise on both chambers of spool 334 during loading of trimmer line onto the spool. A plurality of alignment tabs 339 project radially outwardly from wall 335. Alignment tabs 339 serve to assure that enlarged flange portions 341a are placed improper alignment with the trimmer line guide means structure of upper and lower spool members 334a,334b.

Figure 18:
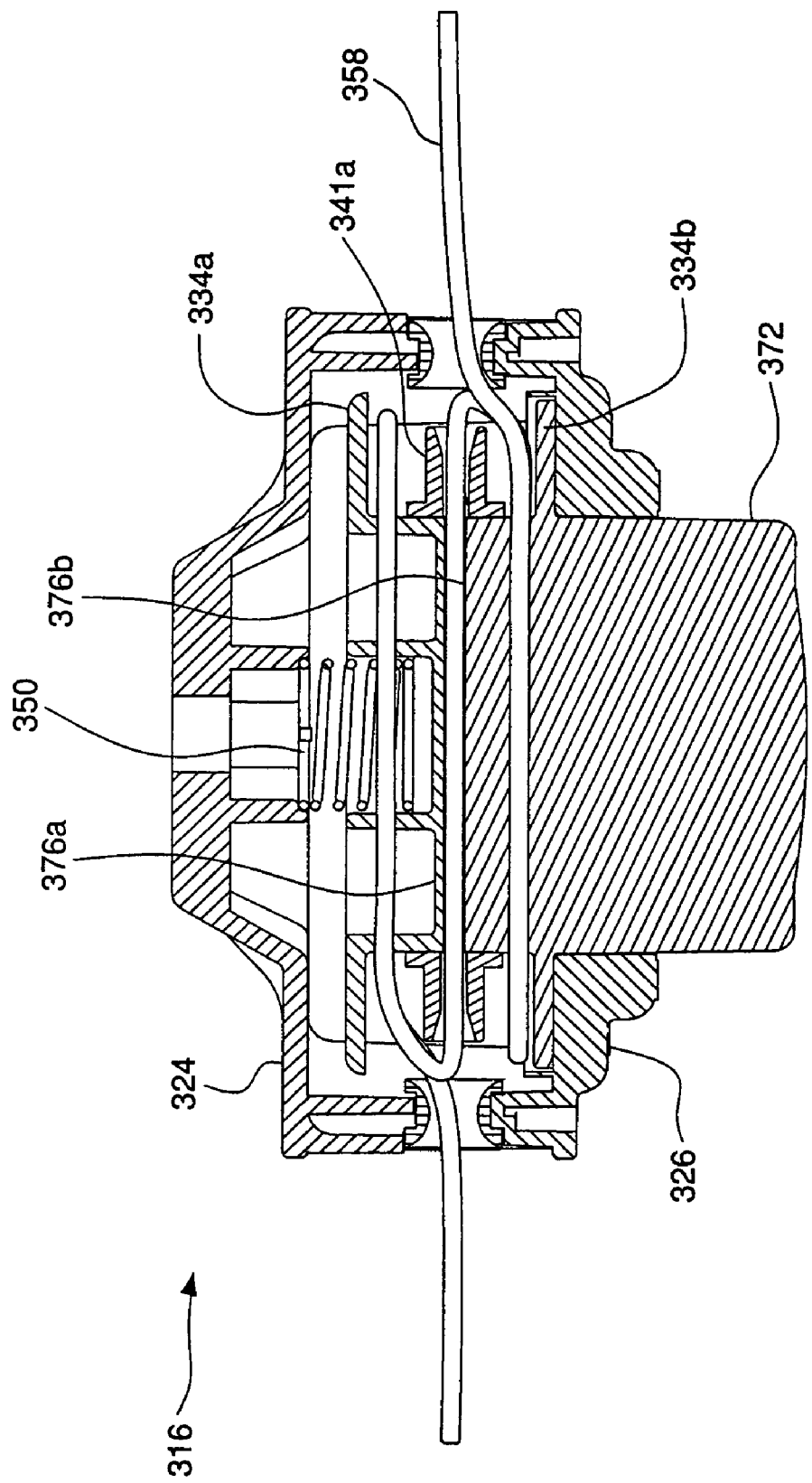
FIG. 18 is an elevational cross-section view of the trimmer head of FIG. 15 illustrating the manner in which trimmer line is coiled on the trimmer head spool thereof.
Figure 19A:
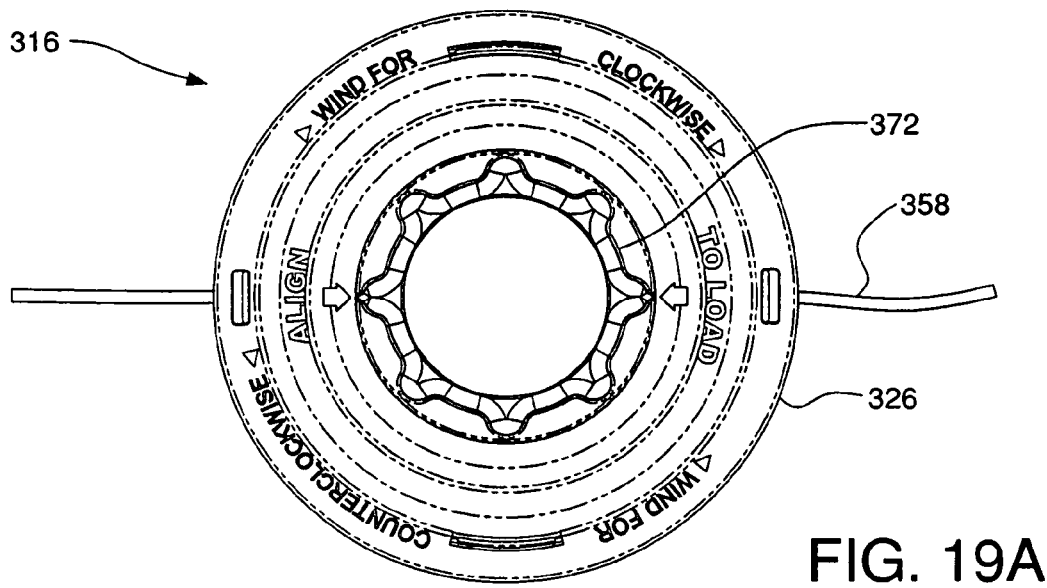
FIG. 19A is a bottom plan view of the trimmer head of FIG. 15 in assembled condition and containing a length of trimmer line therein.
Figure 19B:
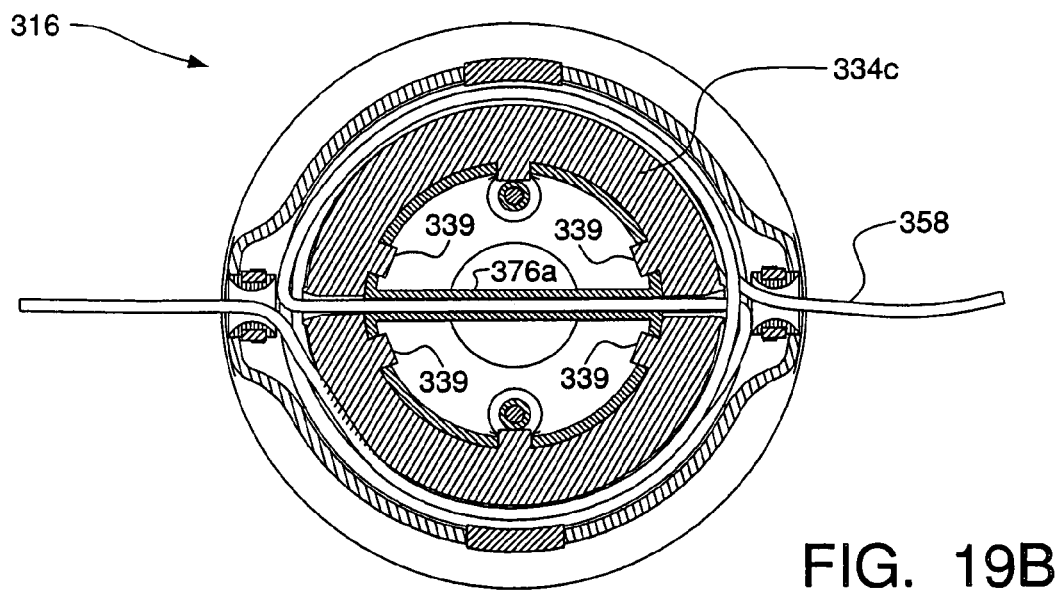
FIG. 19B is an upwardly horizontal cross-section view of the trimmer head of FIG. 15 in assembled condition.

As seen in FIGS. 17, 18 and 19B, upper spool member 334a is provided with a downwardly facing channel 376a that spans the diameter of the upper spool member. Similarly, extending upwardly from the inner surface of the knob 372 of lower spool member 334b is a plate or panel the upper edge of which defines an upwardly facing channel 376b that cooperates to form an enclosed trimmer line passageway. Together with the enlarged flange portions 341a of intermediate collar member 334c define trimmer line guide means spanning substantially the entire inner diameter of trimmer head 316. Before assembling spool 334, the user determines which side of intermediate collar member 334c should be facing upwardly as dictated by the direction of the trimmer apparatus drive shaft to which the trimmer head 316 will be attached. In the event the user has errantly placed the intermediate collar member 334c with the wrong side facing upwardly, he or she may simply invert or flip the collar over so that the correct side faces upwardly.

Once the user has properly assembled spool 334 and the first or upper housing body member has been secured to the threaded arbor of a trimmer apparatus drive shaft, he or she inserts knob 372 through a central opening provided in a lower or second housing body member 326. Biasing means 350 is then installed atop upper spool member 334a and the first and second body members 324, 326 are connected together, e.g., by releasable latch connection. FIG. 19A depicts indicia that may provided on a bottom surface of the bottom trimmer housing member to instruct a user how to load trimmer line 358 into the trimmer head for either clockwise or counterclockwise operation once the trimmer head 316 is assembled.

Although the embodiments of the present invention shown in FIGS. 9-20C represents multiple chamber trimmer spools, it will be understood that the intermediately-located, clockwise- and counterclockwise-specific trimmer line guide means structures thereof could be incorporated into the upper and lower spool flanges, thereby resulting in a single chamber trimmer line spool capable of supporting a single coil of clockwise or counterclockwise wound trimmer line.

Although the invention has been described in detail for the purpose of illustration, it is to be understood that such detail is solely for that purpose and that variations can be made therein by those skilled in the art without departing from the spirit and scope of the invention as defined by the claims.

What is claimed is:

1. A device comprising:
a spool for a trimmer head;
a spool turning member for turning said spool within the trimmer head, said spool turning member including at least
a drive portion having a noncircular shape, and
a knob, which is a portion of the spool turning member that is adapted to be turned by a user; and
the spool having at least
a top having a noncircular socket that is contoured for releasably attaching the knob by at least mating with the noncircular shape of the drive portion;
a bottom having a noncircular socket that is contoured for releasably attaching the knob by at least mating with the noncircular shape of the drive portion;
at least one abutment for releasably engaging and contacting a mechanical bias via the top of the spool and via the bottom of the spool;
a core, the core having at least sides for winding trimmer line around,
a core top, which forms a part of the top of the spool, and
a core bottom, which forms a part of the bottom of the spool; the abutment being located in the core;
wherein
when the spool is not inverted,
the mechanical bias is received and supported by the at least one abutment via the top of the spool, and
the knob is releasably attached to the bottom of the spool, and
when the spool is inverted,
the mechanical bias is received and supported by the at least one abutment via the bottom of the spool, and
the knob is releasably attached to the top of the spool.

2. The device of claim 1, the abutment being attached within the core;
the core top having a top opening; and
the core bottom having a bottom opening;
the mechanical bias being received by the at least one abutment via the bottom opening when the spool is not inverted;
the mechanical bias being received by the at least one abutment via the top opening when the spool is inverted.

3. The device of claim 1, the spool further comprising a collar for stabilizing the mechanical bias, the collar being attached to the at least one abutment.

4. The device of claim 1, the spool further comprising an upper socket on the top of the spool, the upper socket having at least the portion that is contoured of the top of the spool; and
a lower socket on the bottom of the spool, the lower socket having at least the portion that is contoured of the bottom of the spool.

5. The device of claim 1, the spool further comprising:
an upper flange attached to the core top;
a lower flange attached to the core bottom; and
an intermediate flange attached to an interniediate portion of the core.

6. The device of claim 1, the spool having a set of stops including at least one stop on the top of the spool and at least one stop of the bottom of the spool, the set of stops being for engaging a bottom portion of a housing of a trimmer head to rotate with spool, the bottom of the spool faces the bottom portion of the housing when the spool is not inverted, and the top of the spool faces the bottom portion of the housing when the spool is inverted.

7. The device of claim 6, the spool also having a set of sloping projections, each stop of the set of stops being a face of a sloping projection.

8. A vegetation trimmer head adapted to be rotatably driven in either a clockwise or counterclockwise direction by a motorized vegetation trimmer apparatus, said vegetation trimmer head defining a rotational axis and comprising:
a housing having a pair of trimmer line exit ports, a top portion that attaches to a driveshaft of a motorized vegetation trimmer apparatus;
a fastener for releasably attaching the top portion of the housing to the driveshaft;
a spool rotatably received in said housing for carrying at least one coil of flexible trimmer line, the spool includes at least
a core, the core includes at least a pair of oppositely facing axially disposed noncircular sockets;
an upper flange attached to an upper portion of the core,
a lower flange attached to a lower portion of the core,
an intermediate flange attached to an intermediate portion of the core, disposed between the upper flange and the lower flange, for enabling trimmer line to be inserted through said exit ports and onto said spool;
a trimmer line guide formed by a passage in the intermediate flange that is parallel to the intermediate flange;
a set of projections including at least two projections including at least one upper flange projection on the upper flange and at least one lower flange projection on the lower flange;
the spool is invertible, inverting the spool changes a user chosen configuration such that changing the direction of rotation of the driveshaft and inverting the spool changes whether the trimmer line is discharged in a clockwise or counter clockwise direction and changes whether the trimmer head rotates in either a clockwise or counter clockwise direction while trimming;
the trimmer head has a set of depressions including at least one depression, the set of depressions receiving either the at least one upper flange or the at least one lower flange projections, depending on whether the spool is inverted or not inverted;
each projection of the set of projections includes at least a sloped surface for facilitating passage of the projection with respect to the set of depressions while trimmer line is being wound onto the trimmer head, and
a face for engaging the set of depressions causing the trimmer head to rotate with the driveshaft if the projection is on a flange facing the set of depressions;
a mechanical bias located between
a top portion of the housing, which attaches to the drive shaft, and the spool,
the mechanical bias being for biasing at least one depression of the set of depressions into engagement with at least one projection of the set of projections, via the face of the projection, such that the trimmer head rotates in a first direction with the driveshaft if the driveshaft rotates in the first direction; and
a spool turning member for turning the spool, the spool turning member including at least
a drive portion having a noncircular shape that substantially mates with the noncircular sockets, and
a knob portion adapted to be turned by a user;
the spool turning member being
releasably attached to a first of the pair of oppositely facing axially disposed noncircular sockets if the spool is not inverted and
releasably attached to a second of the pair of oppositely facing axially disposed noncircular sockets if the spool is not inverted.

9. A trimmer head comprising the spool of claim 1, and the trimmer head including at least:
a housing having a pair of trimmer line exit ports and
a fastener for enabling releasably attaching said housing to a driveshaft of a motorized vegetation trimmer apparatus;
the spool being rotatably received in said housing for carrying at least one coil of flexible trimmer line; and
a flange for enabling trimmer line to be inserted through said exit ports and onto said spool in a user-selected clockwise or counterclockwise direction without removing said spool from said housing such that trimmer line is dischargeable from said trimmer head in an appropriate clockwise or counterclockwise direction dictated by a user-chosen configuration and the direction of rotation of a driveshaft of a motorized vegetation trimmer apparatus when the trimmer head is driven thereby, the flange being part of the spool.

10. The trimmer head of claim 9, wherein said spool is invertible, inverting the spool changes the user chosen configuration such that changing the direction of rotation and inverting the spool changes whether the trimmer line is discharged in a clockwise or counter clockwise direction.

11. The trimmer head of claim 9, wherein
the trimmer head has a set of latches including at least two latches, the set of latches, latch the spool to the housing, the set of latches include at least two projections that are carried by one of said housing and said spool, the projections being for releasably locking said spool against rotation with respect to said housing; and
depressions are carried by the other of said housing and said spool for receiving said projections.

12. The vegetation trimmer head of claim 11, wherein said projections are carried by said spool and said depressions are carried by said housing.

13. The vegetation trimmer head of claim 11, further comprising the mechanical bias, which biases said projections into engagement with said depressions.

14. The vegetation trimmer head of claim 13, wherein said mechanical bias comprises a spring.

15. The vegetation trimmer head of claim 11, wherein said projections include a sloped surface for facilitating passage of said projections with respect to said depressions when trimmer line is wound onto the trimmer head.

16. The vegetation trimmer head of claim 9, wherein the flange is attached to the core, the portion that is contoured for releasably attaching the knob that is on the top and the portion that is contoured for releasably attaching the knob that is on the bottom are formed by at least a pair of oppositely facing axially disposed noncircular sockets.

17. A trimmer head comprising:
a spool having at least
a top having a portion that is contoured for releasably attaching a knob;
a bottom having a portion that is contoured for releasably attaching the knob;
at least one abutment for releasably engaging a mechanical bias via the top of the spool and via the bottom of the spool;
a core, the core having at least
sides for winding trimmer line around,
a core top, which forms a part of the top of the spool, and
a core bottom, which forms a part of the bottom of the spool; the abutment being located in the core; wherein
if the spool is not inverted,
the mechanical bias is received and supported by the at least one abutment for releasably engaging and contacting a mechanical bias via the top of the spool, and
the knob is releasably attached to the bottom of the spool, and
if the spool is inverted,
the mechanical bias is received and supported by the at least one abutment via the bottom of the spool, and
the knob is releasably attached to the top of the spool;
and the trimmer head including at least:
a housing having a pair of trimmer line exit ports and
a fastener for enabling releasably attaching said housing to a driveshaft of a motorized vegetation trimmer apparatus;
the spool being rotatably received in said housing for carrying at least one coil of flexible trimmer line; and
a flange for enabling trimmer line to be inserted through said exit ports and onto said spool in a user-selected clockwise or counterclockwise direction without removing said spool from said housing such that trimmer line is dischargeable from said trimmer head in an appropriate clockwise or counterclockwise direction dictated by a user-chosen configuration and the direction of rotation of a driveshaft of a motorized vegetation trimmer apparatus when the trimmer head is driven thereby, the flange being part of the spool;
wherein the flange is attached to the core, the portion that is contoured for releasably attaching the knob that is on the top and the portion that is contoured for releasably attaching the knob that is on the bottom are formed by at least a pair of oppositely facing axially disposed noncircular sockets;
the trimmer head also including at least
a spool turning member for turning said spool, said spool turning member including at least
a drive portion having a noncircular shape that substantially mates with said noncircular sockets, and
the knob, which is a portion of the spool turning member that is adapted to be turned by a user.

18. The vegetation trimmer head of claim 9 wherein said flange comprising a trimmer line guide that enables trimmer line to be wound through said exit ports and onto said spool.

19. The vegetation trimmer head of claim 18 wherein the flange is an intermediate flange, said spool further comprises the core,
an upper flange attached to an upper portion of the core,
a lower flange attached to a lower portion of the core, and
wherein said intermediate flange is attached to a middle portion of the core, disposed between said upper flange and lower flange, the trimmer line guide being formed by a passage in the intermediate flange.

20. The vegetation trimmer head of claim 19, wherein said intermediate flange further comprises oppositely oriented trimmer line guide openings to ensure that trimmer line is wound onto said spool in an appropriate clockwise or counterclockwise direction dictated by the direction of rotation of a driveshaft of a motorized vegetation trimmer apparatus when the trimmer head is driven thereby, the trimmer line guide openings being formed with a portion of the intermediate flange associated with the trimmer line guide.

21. The vegetation trimmer head of claim 9 wherein said spool includes at least a passage way coplanar with said flange, the passage way and the flange together define the trimmer line guide, the trimmer line guide facilitates passage of trimmer line between said exit ports.

22. The vegetation trimmer head of claim 21, wherein said flange comprises oppositely oriented trimmer line guide openings to ensure that trimmer line is wound onto said spool in an appropriate clockwise or counterclockwise direction dictated by the direction of rotation of a driveshaft of a motorized vegetation trimmer apparatus when the trimmer head is driven thereby.

23. A device comprising the spool of claim 1, the device further including at least:
a trimmer head releasably attached to a driveshaft, the trimmer head having
a first state in which the trimmer head rotates with the driveshaft as the driveshaft turns, and
a second state in which trimmer line is released as the driveshaft turns;
a first configuration in which the spool is not inverted and during the first state the trimmer head rotates in a first direction with the drive shaft if the driveshaft rotates in the first direction; and
a second configuration in which the spool is inverted and during the first state the trimmer head rotates in a second direction if the driveshaft rotates in the second direction.

24. The device of claim 23, wherein the trimmer head has
a top side to which the driveshaft is releasably attached;
a bottom side; and
a knob that protrudes through the bottom side, tapping the knob while the vegetation trimmer head is powered and is turning with the driveshaft causes the trimmer head to switch from the first state to the second state, releasing trimmer line whether the trimmer head is in the first configuration or the second configuration, and while the vegetation trimmer head is not powered, pushing the knob inward and manually turning the knob causes trimmer line to be released whether the trimmer head is in the first configuration or the second configuration.

* * * * *